United States Patent
Cao

(10) Patent No.: US 10,667,283 B2
(45) Date of Patent: May 26, 2020

(54) METHOD AND APPARATUS FOR REPORTING BUFFER STATUS REPORT

(71) Applicant: Huawei Technologies Co., Ltd., Shenzhen (CN)

(72) Inventor: Zhenzhen Cao, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 149 days.

(21) Appl. No.: 15/426,773

(22) Filed: Feb. 7, 2017

(65) Prior Publication Data

US 2017/0150512 A1  May 25, 2017

Related U.S. Application Data

(63) Continuation of application No. PCT/CN2014/084004, filed on Aug. 8, 2014.

(51) Int. Cl.
*H04W 72/12* (2009.01)
*H04W 72/04* (2009.01)
(Continued)

(52) U.S. Cl.
CPC ....... *H04W 72/1205* (2013.01); *H04W 24/10* (2013.01); *H04W 72/04* (2013.01);
(Continued)

(58) Field of Classification Search
CPC combination set(s) only.
See application file for complete search history.

(56) References Cited

U.S. PATENT DOCUMENTS

| | | | |
|---|---|---|---|
| 2010/0008236 A1* | 1/2010 | Zhang | H04W 72/1284 370/241 |
| 2011/0141983 A1* | 6/2011 | Hong | H04W 28/0278 370/329 |

(Continued)

FOREIGN PATENT DOCUMENTS

| CN | 102958066 A | 3/2013 |
|---|---|---|
| CN | 103037359 A | 4/2013 |

(Continued)

OTHER PUBLICATIONS

U.S. Appl. No. 61/991,082; Chen et al, filed May 9, 2014 (Year: 2014).*

(Continued)

*Primary Examiner* — Hicham B Foud
(74) *Attorney, Agent, or Firm* — Leydig, Voit & Mayer, Ltd.

(57) ABSTRACT

A method for reporting a buffer status report and terminal devices are provided. The method by a terminal device comprises: receiving first uplink resource scheduling information sent by a base station, wherein the first uplink resource scheduling information is used to indicate a first uplink resource allocated to the terminal device; when the first uplink resource cannot carry an entire buffer status report (BSR) of the terminal device, sending a first part of the entire BSR of the terminal device to the base station on the first uplink resource, wherein the first part does not comprise the entire BSR of the terminal device. The method provides a solution to sending BSR for a D2D device with limited resources.

15 Claims, 7 Drawing Sheets

FIG. 6

(51) Int. Cl.
H04W 24/10 (2009.01)
H04W 76/14 (2018.01)

(52) U.S. Cl.
CPC ... H04W 72/1268 (2013.01); H04W 72/1284 (2013.01); H04W 76/14 (2018.02)

(56) References Cited

U.S. PATENT DOCUMENTS

| | | | |
|---|---|---|---|
| 2011/0274044 A1* | 11/2011 | Park | H04L 47/10 370/328 |
| 2012/0099452 A1 | 4/2012 | Dai et al. | |
| 2012/0190376 A1 | 7/2012 | Rosa et al. | |
| 2013/0150061 A1 | 6/2013 | Shin et al. | |
| 2013/0258996 A1 | 10/2013 | Jung et al. | |
| 2013/0322413 A1 | 12/2013 | Pelletier et al. | |
| 2014/0206372 A1 | 7/2014 | Zeng et al. | |
| 2015/0043352 A1* | 2/2015 | Jang | H04W 72/1284 370/241 |
| 2015/0117241 A1* | 4/2015 | Koc | H04W 76/18 370/252 |
| 2015/0334714 A1* | 11/2015 | Wang | H04W 72/0473 370/329 |
| 2016/0021694 A1* | 1/2016 | Pan | H04W 76/14 370/329 |
| 2016/0044653 A1* | 2/2016 | Bagheri | H04W 72/0413 370/329 |
| 2017/0019893 A1 | 1/2017 | Zhao et al. | |

FOREIGN PATENT DOCUMENTS

| | | |
|---|---|---|
| CN | 103188742 A | 7/2013 |
| CN | 103874049 A | 6/2014 |
| EP | 2378806 A1 | 10/2011 |
| EP | 2688332 B1 | 4/2016 |
| EP | 3128796 A1 | 2/2017 |
| JP | 2014508488 A | 4/2014 |
| JP | 2014138311 A | 7/2014 |
| JP | 2017513403 A | 5/2017 |
| KR | 20130065373 A | 6/2013 |
| KR | 20130109781 A | 10/2013 |
| RU | 2012116624 A | 11/2013 |
| WO | 2012128511 A2 | 9/2012 |
| WO | 2013029462 A1 | 3/2013 |
| WO | 2013097586 A1 | 7/2013 |

OTHER PUBLICATIONS

"3$^{rd}$ Generation Partnership Project; Technical Specification Group Radio Access Network; Evolved Universal Terrestrial Radio Access (E-UTRA); Medium Access Control (MAC) protocol specification (Release 12)," 3GPP TS 36.321, V12.2.1, pp. 1-57, 3$^{rd}$ Generation Partnership Project, Valbonne, France (Jun. 2014).
"3$^{rd}$ Generation Partnership Project; Technical Specification Group Radio Access Network; Evolved Universal Terrestrial Radio Access (E-UTRA); Radio Resource Control (RRC); Protocol specification (Release 12)," 3GPP TS 36.331, V12.2.0, pp. 1-365, 3$^{rd}$ Generation Partnership Project, Valbonne, France (Jun. 2014).
"BSR for D2D," 3GPP TSG-RAN WG2 Meeting #86, Seoul, Korea, R2-142587,3rd Generation Partnership Project, Valbonne, France (May 19-23, 2014).
"Clarification for BSR transmission without enough UL resources," 3GPP TSG RAN-Meeting #68, Jeju, Korea, R2-096777, 3rd Generation Partnership Project, Valbonne, France (Nov. 9-13, 2009).
R2-142229, Huawei, HiSilicon, "D2D BSR Triggering and Sending Mechanism," 3GPP TSG RAN WG2 Meeting #86, Seoul, Korea, May 19-23, 2014, total 3 pages.
"3rd Generation Partnership Project; Technical Specification Group Radio Access Network; Study on LTE Device to Device Proximity Services; Radio Aspects (Release 12)," pp. 1-50, 3GPP TR 36.843 V12.0.1, 3rd Generation Partnership Project—Valbonne, France (Mar. 2014).
"[85bis#19][LTE/D2D] Resource allocation details for D2D Communication," 3GPP DRAFT, R2-142429, Seoul, Korea, vol. RAN WG2, XP050793576, pp. 1-20, 3rd Generation Partnership Project—Valbonne, France (May 18, 2014).
"Mode-1 in coverage exception handling," 3GPP DRAFT, R2-142230, Seoul, Korea, XP050793417, pp. 1-7, 3rd Generation Partnership Project—Valbonne, France (May 18, 2014).
"BSR for D2D communication," 3GPP TSG-RAN WG2 #86, Seoul, Republic of Korea, pp. 1-3, R2-142277, 3rd Generation Partnership Project—Valbonne, France (May 19-23, 2014).
IN/201737003926, Office Action, dated Mar. 14, 2020.

* cited by examiner

METHOD AND APPARATUS FOR REPORTING BUFFER STATUS REPORT

CROSS-REFERENCE TO RELATED APPLICATIONS

This application is a continuation of International Application No. PCT/CN2014/084004, filed on Aug. 8, 2014, the disclosure of which is hereby incorporated by reference in its entirety.

TECHNICAL FIELD

Embodiments of the present invention relate to the field of wireless communications technologies, and in particular, to a method and an apparatus for reporting a buffer status report.

BACKGROUND

A device to device (D2D) communications technology is a technology for direct communication between terminals. A difference between the D2D communications technology and a cellular communications technology lies in that, data sent by a terminal during D2D communication does not need to be transmitted by using a base station but is directly transmitted by using an air interface between terminals, thereby reducing a delay in forwarding data by using a base station.

A terminal that performs D2D communication may be referred to as a D2D device, multiple D2D devices form one D2D communication group, and D2D devices in a same D2D communication group perform D2D communication between one another. The D2D device has two resource scheduling modes: a base station-based resource scheduling mode (a first mode) and an autonomous resource selection mode (a second mode). In the base station-based resource scheduling mode, a resource used by the D2D device for performing data transmission is scheduled by a base station in a cellular network. The D2D device needs to report, to the base station by using a buffer status report (BSR), a volume of D2D data to be sent, and the base station schedules a corresponding resource for the D2D device according to the volume of the data in the BSR. To report the BSR to the base station, the D2D device also needs to use a particular uplink resource, and the uplink resource is also allocated by the base station to the D2D device.

A feature of the D2D communication is that a D2D device may simultaneously communicate with multiple other D2D devices (or multiple D2D communication groups). Therefore, a BSR reported by the D2D device may include a data volume of communication between the D2D device and the multiple other D2D devices (or the multiple D2D communication groups), causing that an uplink resource needed for sending the D2D BSR is relatively large. In the base station-based resource scheduling mode, an uplink resource that is used for sending the BSR and is allocated by a base station to the D2D device is limited, which causes that the D2D device may not be capable of sending information about an entire BSR to the base station.

SUMMARY

Embodiments of the present invention provide a method and an apparatus for reporting a buffer status report, which are used to make UE to report an entire BSR.

A first aspect provides user equipment, including:

a receiving module, configured to receive first uplink resource scheduling information sent by a base station, where the first uplink resource scheduling information is used to indicate a first uplink resource allocated to the UE;

a processing module, configured to determine whether the first uplink resource can carry an entire BSR of the UE; and a sending module, configured to: if the processing module determines that the first uplink resource cannot carry the entire BSR of the UE, send a first part of the entire BSR of the UE to the base station on the first uplink resource, where the first part does not include the entire BSR of the UE, where the receiving module is further configured to receive second uplink resource scheduling information sent by the base station, where the second uplink resource scheduling information is used to indicate a second uplink resource allocated to the UE; and the sending module is further configured to send a second part of the entire BSR of the UE to the base station on the second uplink resource.

With reference to the first aspect, in a first possible implementation manner of the first aspect, the second part includes another part of the entire BSR of the UE except the first part; or the second part includes the entire BSR of the UE.

With reference to the first aspect or the first possible implementation manner of the first aspect, in a second possible implementation manner of the first aspect, the sending module is further configured to: before the receiving module receives the second uplink resource scheduling information sent by the base station, send, to the base station, information indicating that not the entire BSR is sent.

With reference to the second possible implementation manner of the first aspect, in a third possible implementation manner of the first aspect, the information indicating that not the entire BSR is sent includes at least one of the following information: remaining BSR indication information, and remaining-BSR capacity information.

With reference to any possible implementation manner of the first aspect to the third possible implementation manner of the first aspect, in a fourth possible implementation manner of the first aspect, the receiving module is specifically configured to receive the first uplink resource scheduling information periodically sent by the base station.

With reference to any possible implementation manner of the first aspect to the third possible implementation manner of the first aspect, in a fifth possible implementation manner of the first aspect, the processing module is further configured to: before the receiving module receives the first uplink resource scheduling information sent by the base station, trigger reporting of an SR; and the sending module is further configured to send a first SR to the base station after the processing module triggers the reporting of an SR, where the reporting of an SR is triggered when the processing module triggers reporting of a regular BSR and when there is no uplink resource used for sending a BSR of the UE.

With reference to the fifth possible implementation manner of the first aspect, in a sixth possible implementation manner of the first aspect, the processing module is specifically configured to: when the UE is switched from an autonomous resource selection mode to a base station-based resource scheduling mode, and when there is data on a current device to device D2D logical channel of the UE to be transmitted, trigger the reporting of a regular BSR.

With reference to the fifth or the sixth possible implementation manner of the first aspect, in a seventh possible implementation manner of the first aspect, the sending module is specifically configured to send a second SR to the base station before the UE receives the second uplink resource scheduling information sent by the base station.

With reference to any possible implementation manner of the fifth to the seventh possible implementation manners of the first aspect, in an eighth possible implementation manner of the first aspect, the processing module is further configured to: when the sending module has sent the entire BSR of the UE to the base station, cancel already triggered reporting of an SR or reporting of a regular BSR.

With reference to any possible implementation manner of the fifth to the seventh possible implementation manners of the first aspect, in a ninth possible implementation manner of the first aspect, the processing module is further configured to: when the UE is switched from the base station-based resource scheduling mode to the autonomous resource selection mode, cancel reporting, which is already triggered and is used for a D2D resource request, of an SR, where the reporting, which is used for the D2D resource request, of an SR refers to reporting, of an SR, that is triggered when after reporting of a D2D BSR is triggered, there is no uplink resource sending a D2D BSR.

With reference to any possible implementation manner of the first aspect to the seventh possible implementation manner of the first aspect, in a tenth possible implementation manner of the first aspect, the processing module is further configured to: when the UE is switched from the base station-based resource scheduling mode to the autonomous resource selection mode, cancel already triggered reporting of a BSR.

With reference to any possible implementation manner of the first aspect to the seventh possible implementation manner of the first aspect, in an eleventh possible implementation manner of the first aspect, the processing module is further configured to: when the UE is switched from the base station-based resource scheduling mode to the autonomous resource selection mode, cancel a random access process that is already triggered and is used for a D2D resource request, where the random access that is used for the D2D resource request refers to a random access process that is triggered when after reporting of a D2D BSR is triggered, there is no uplink resource sending a D2D BSR and no physical uplink control channel (PUCCH) for sending an SR is configured for the UE; and the canceling, a random access process that is already triggered and is used for a D2D resource request includes at least one of the following operations: canceling sending of a preamble code, canceling sending of a message 3 (MSG 3), and ending the random access process and considering that the random access process is successfully completed.

With reference to any possible implementation manner of the first aspect to the eleventh possible implementation manner of the first aspect, in a twelfth possible implementation manner of the first aspect, the BSR includes the D2D BSR.

A second aspect provides a base station, including:
a sending module, configured to send first uplink resource scheduling information to UE, where the first uplink resource scheduling information is used to indicate a first uplink resource allocated to the UE;
a receiving module, configured to: if the first uplink resource cannot carry an entire BSR of the UE, receive a first part that is of the entire BSR of the UE and is sent by the UE on the first uplink resource, where the first part does not include the entire BSR of the UE, where
the sending module is further configured to send second uplink resource scheduling information to the UE, where the second uplink resource scheduling information is used to indicate a second uplink resource allocated to the UE; and
the receiving module is further configured to receive a second part that is of the entire BSR of the UE and is sent by the UE on the second uplink resource; and
a processing module, configured to allocate the first uplink resource and the second uplink resource to the UE.

With reference to the second aspect, in a first possible implementation manner of the second aspect, the second part includes another part of the entire BSR of the UE except the first part; or
the second part includes the entire BSR of the UE.

With reference to the second aspect or the first possible implementation manner of the second aspect, in a second possible implementation manner of the second aspect, the sending module is further configured to: before the sending module sends the second uplink resource scheduling information to the UE, receive information indicating that not the entire BSR is sent that is sent by the UE.

With reference to the second possible implementation manner of the second aspect, in a third possible implementation manner of the second aspect, the information indicating that not the entire BSR is sent includes at least one of the following information: remaining BSR indication information, and remaining-BSR capacity information.

With reference to any possible implementation manner of the second aspect to the third possible implementation manner of the second aspect, in a fourth possible implementation manner of the second aspect, the receiving module is specifically configured to periodically send the first uplink resource scheduling information to the UE.

With reference to any possible implementation manner of the second aspect to the third possible implementation manner of the second aspect, in a fifth possible implementation manner of the second aspect, the receiving module is further configured to: before the sending module sends the first uplink resource scheduling information to the UE, receive a first SR sent by the UE, where the first SR is sent after reporting of an SR is triggered when the UE triggers reporting of a regular BSR and when there is no uplink resource used for sending a BSR of the UE.

With reference to the fifth possible implementation manner of the second aspect, in a sixth possible implementation manner of the second aspect, the receiving module is further configured to: before the sending module sends the second uplink resource scheduling information to the UE, receive a second SR sent by the UE.

With reference to any possible implementation manner of the second aspect to the sixth possible implementation manner of the second aspect, in a seventh possible implementation manner of the second aspect, the BSR includes a D2D BSR.

A third aspect provides user equipment, including:
a receiving module, configured to receive first uplink resource scheduling information sent by a base station, where the first uplink resource scheduling information is used to indicate a first uplink resource allocated to the UE;
a processing module, configured to trigger reporting of a padding BSR, and determine whether a remaining resource can carry an entire BSR of the UE after the first uplink resource carries uplink data and a MAC PDU; and
a sending module, configured to: if the processing module triggers the reporting of a padding BSR and determines that the remaining resource cannot carry the entire BSR of the UE after the first uplink resource carries the uplink data and the MAC PDU, send a BSR to the base station according to a preset BSR priority rule.

With reference to the third aspect, in a first possible implementation manner of the third aspect, the BSR priority rule includes that: a priority of a cellular BSR is higher than a priority of a D2D BSR.

A fourth aspect provides a base station, including:

a sending module, configured to send first uplink resource scheduling information to UE, where the first uplink resource scheduling information is used to indicate a first uplink resource allocated to the UE;

a receiving module, configured to receive, on the first uplink resource, a BSR that is sent by the UE to the base station according to a preset BSR priority rule, where the BSR is sent after the UE determines that a remaining resource cannot carry an entire BSR of the UE after the uplink resource carries uplink data and a MAC PDU; and a processing module, configured to allocate the first uplink resource to the UE.

With reference to the fourth aspect, in a first possible implementation manner of the fourth aspect, the BSR priority rule includes that: a priority of a cellular BSR is higher than a priority of a D2D BSR.

A fifth aspect provides a method for reporting a buffer status report, including:

receiving, by UE, first uplink resource scheduling information sent by a base station, where the first uplink resource scheduling information is used to indicate a first uplink resource allocated to the UE;

if the first uplink resource cannot carry an entire BSR of the UE, sending, by the UE, a first part of the entire BSR of the UE to the base station on the first uplink resource, where the first part does not include the entire BSR of the UE;

receiving, by the UE, second uplink resource scheduling information sent by the base station, where the second uplink resource scheduling information is used to indicate a second uplink resource allocated to the UE; and sending, by the UE, a second part of the entire BSR of the UE to the base station on the second uplink resource.

With reference to the fifth aspect, in a first possible implementation manner of the fifth aspect, the second part includes another part of the entire BSR of the UE except the first part; or the second part includes the entire BSR of the UE.

With reference to the fifth aspect or the first possible implementation manner of the fifth aspect, in a second possible implementation manner of the fifth aspect, before the receiving, by the UE, second uplink resource scheduling information sent by the base station, the method further includes: sending, by the UE to the base station, information indicating that not the entire BSR is sent.

With reference to the second possible implementation manner of the fifth aspect, in a third possible implementation manner of the fifth aspect, the information indicating that not the entire BSR is sent includes at least one of the following information: remaining BSR indication information, and remaining-BSR capacity information.

With reference to any possible implementation manner of the fifth aspect to the third possible implementation manner of the fifth aspect, in a fourth possible implementation manner of the fifth aspect, the receiving, by UE, first uplink resource scheduling information sent by a base station includes:

receiving, by the UE, the first uplink resource scheduling information periodically sent by the base station.

With reference to any possible implementation manner of the fifth aspect to the third possible implementation manner of the fifth aspect, in a fourth possible implementation manner of the fifth aspect, before the receiving, by UE, first uplink resource scheduling information sent by a base station, the method further includes:

triggering, by the UE, reporting of an SR, and sending a first SR to the base station, where the reporting of an SR is triggered when the UE triggers reporting of a regular BSR and when there is no uplink resource used for sending a BSR of the UE.

With reference to the fifth possible implementation manner of the fifth aspect, in a sixth possible implementation manner of the fifth aspect, the triggering, by the UE, reporting of a regular BSR includes:

when the UE is switched from an autonomous resource selection mode to a base station-based resource scheduling mode, and when there is data on a current device to device D2D logical channel of the UE to be transmitted, triggering, by the UE, the reporting of a regular BSR.

With reference to the fifth or the sixth possible implementation manner of the fifth aspect, in a seventh possible implementation manner of the fifth aspect, before the receiving, by the UE, second uplink resource scheduling information sent by the base station, the method further includes:

sending, by the UE, a second SR to the base station.

With reference to any possible implementation manner of the fifth to the seventh possible implementation manners of the fifth aspect, in an eighth possible implementation manner of the fifth aspect, the method further includes:

when the UE has sent the entire BSR of the UE to the base station, canceling, by the UE, already triggered reporting of an SR or reporting of a regular BSR.

With reference to any possible implementation manner of the fifth to the seventh possible implementation manners of the fifth aspect, in a ninth possible implementation manner of the fifth aspect, the method further includes: when the UE is switched from the base station-based resource scheduling mode to the autonomous resource selection mode, canceling, by the UE, reporting, which is already triggered and is used for a D2D resource request, of an SR, where the reporting, which is used for the D2D resource request, of the SR refers to reporting, of an SR, that is triggered when after reporting of a D2D BSR is triggered, there is no uplink resource sending a D2D BSR.

With reference to any possible implementation manner of the fifth aspect to the seventh possible implementation manner of the fifth aspect, in a tenth possible implementation manner of the fifth aspect, the method further includes:

when the UE is switched from the base station-based resource scheduling mode to the autonomous resource selection mode, canceling, by the UE, already triggered reporting of a BSR.

With reference to any possible implementation manner of the fifth aspect to the seventh possible implementation manner of the fifth aspect, in an eleventh possible implementation manner of the fifth aspect, the method includes: when the UE is switched from the base station-based resource scheduling mode to the autonomous resource selection mode, canceling a random access process that is already triggered and is used for a D2D resource request, where the random access that is used for the D2D resource request refers to a random access process that is triggered when after reporting of a D2D BSR is triggered, there is no uplink resource sending a D2D BSR and no PUCCH for sending an SR is configured for the UE; and the canceling, a random access process that is already triggered and is used for a D2D resource request includes at least one of the following operations: canceling sending of a Preamble code, canceling sending of an MSG 3, and ending the random access process and considering that the random access process is successfully completed.

With reference to any possible implementation manner of the fifth aspect to the eleventh possible implementation manner of the fifth aspect, in a twelfth possible implementation manner of the fifth aspect, the BSR includes the D2D BSR.

A sixth aspect provides a method for reporting a buffer status report, including:

sending, by a base station, first uplink resource scheduling information to UE, where the first uplink resource scheduling information is used to indicate a first uplink resource allocated to the UE;

if the first uplink resource cannot carry an entire BSR of the UE, receiving, by the base station, a first part that is of the entire BSR of the UE and is sent by the UE on the first uplink resource, where the first part does not include the entire BSR of the UE;

sending, by the base station, second uplink resource scheduling information to the UE, where the second uplink resource scheduling information is used to indicate a second uplink resource allocated to the UE; and receiving, by the base station, a second part that is of the entire BSR of the UE and is sent by the UE on the second uplink resource.

With reference to the sixth aspect, in a first possible implementation manner of the sixth aspect, the second part includes another part of the entire BSR of the UE except the first part; or the second part includes the entire BSR of the UE.

With reference to the sixth aspect or the first possible implementation manner of the sixth aspect, in a second possible implementation manner of the sixth aspect, before the sending, by the base station, second uplink resource scheduling information to the UE, the method further includes:

receiving, by the base station, information indicating that not the entire BSR is sent that is sent by the UE.

With reference to the second possible implementation manner of the sixth aspect, in a third possible implementation manner of the sixth aspect, the information indicating that not the entire BSR is sent includes at least one of the following information: remaining BSR indication information, and residual BSR capacity information.

With reference to any possible implementation manner of the sixth aspect to the third possible implementation manner of the sixth aspect, in a fourth possible implementation manner of the sixth aspect, the sending, by a base station, first uplink resource scheduling information to UE includes:

periodically sending, by the base station, the first uplink resource scheduling information to the UE.

With reference to any possible implementation manner of the sixth aspect to the third possible implementation manner of the sixth aspect, in a fifth possible implementation manner of the sixth aspect, before the sending, by a base station, first uplink resource scheduling information to UE, the method further includes:

receiving, by the base station, a first SR sent by the UE, where the first SR is sent after reporting of an SR is triggered when the UE triggers reporting of a regular BSR and when there is no uplink resource used for sending a BSR of the UE.

With reference to the fifth possible implementation manner of the sixth aspect, in a sixth possible implementation manner of the sixth aspect, before the sending, by the base station, second uplink resource scheduling information to the UE, the method further includes:

receiving, by the base station, a second SR sent by the UE.

With reference to any possible implementation manner of the sixth aspect to the sixth possible implementation manner of the sixth aspect, in a seventh possible implementation manner of the sixth aspect, the BSR includes a D2D BSR.

A seventh aspect provides a method for reporting a buffer status report, including:

receiving, by UE, first uplink resource scheduling information sent by a base station, where the first uplink resource scheduling information is used to indicate a first uplink resource allocated to the UE;

if the UE triggers reporting of a padding BSR, and a remaining resource cannot carry an entire BSR of the UE after the first uplink resource carries uplink data and a MAC PDU, sending, by the UE, a BSR to the base station according to a preset BSR priority rule.

With reference to the seventh aspect, in a first possible implementation manner of the seventh aspect, the BSR priority rule includes that: a priority of a cellular BSR is higher than a priority of a D2D BSR.

An eighth aspect provides a method for reporting a buffer status report, including:

sending, by a base station, first uplink resource scheduling information to UE, where the first uplink resource scheduling information is used to indicate a first uplink resource allocated to the UE;

if a remaining resource cannot carry an entire BSR of the UE after the uplink resource carries uplink data and a MAC PDU, receiving, by the base station on the first uplink resource, a BSR that is sent by the UE to the base station according to a preset BSR priority rule.

With reference to the eighth aspect, in a first possible implementation manner of the eighth aspect, the BSR priority rule includes that: a priority of a cellular BSR is higher than a priority of a D2D BSR.

According to the method and apparatus for reporting a buffer status report provided in the embodiments of the present invention, after UE receives first uplink resource scheduling information sent by a base station, if an entire BSR of the UE cannot be sent on a first uplink resource, the UE sends a first part of the entire BSR of the UE to the base station, so that the base station allocates a second uplink resource to the UE; after the UE receives second uplink resource scheduling information sent by the base station, the UE sends a second part of the entire BSR of the UE to the base station on the second uplink resource, so that the UE can send the entire BSR to the base station.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show some embodiments of the present invention, and persons of ordinary skill in the art may still derive other drawings from these accompanying drawings without creative efforts.

DESCRIPTION OF EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the present invention.

In a Long Term Evolution (LTE) system, there are manners of reporting three types of BSRs: reporting of a regular BSR, reporting of a periodic BSR, and reporting of a padding BSR. User equipment (UE) reports a BSR to an evolved nodeB (eNB) in manners of reporting different BSRs.

Figure 1:
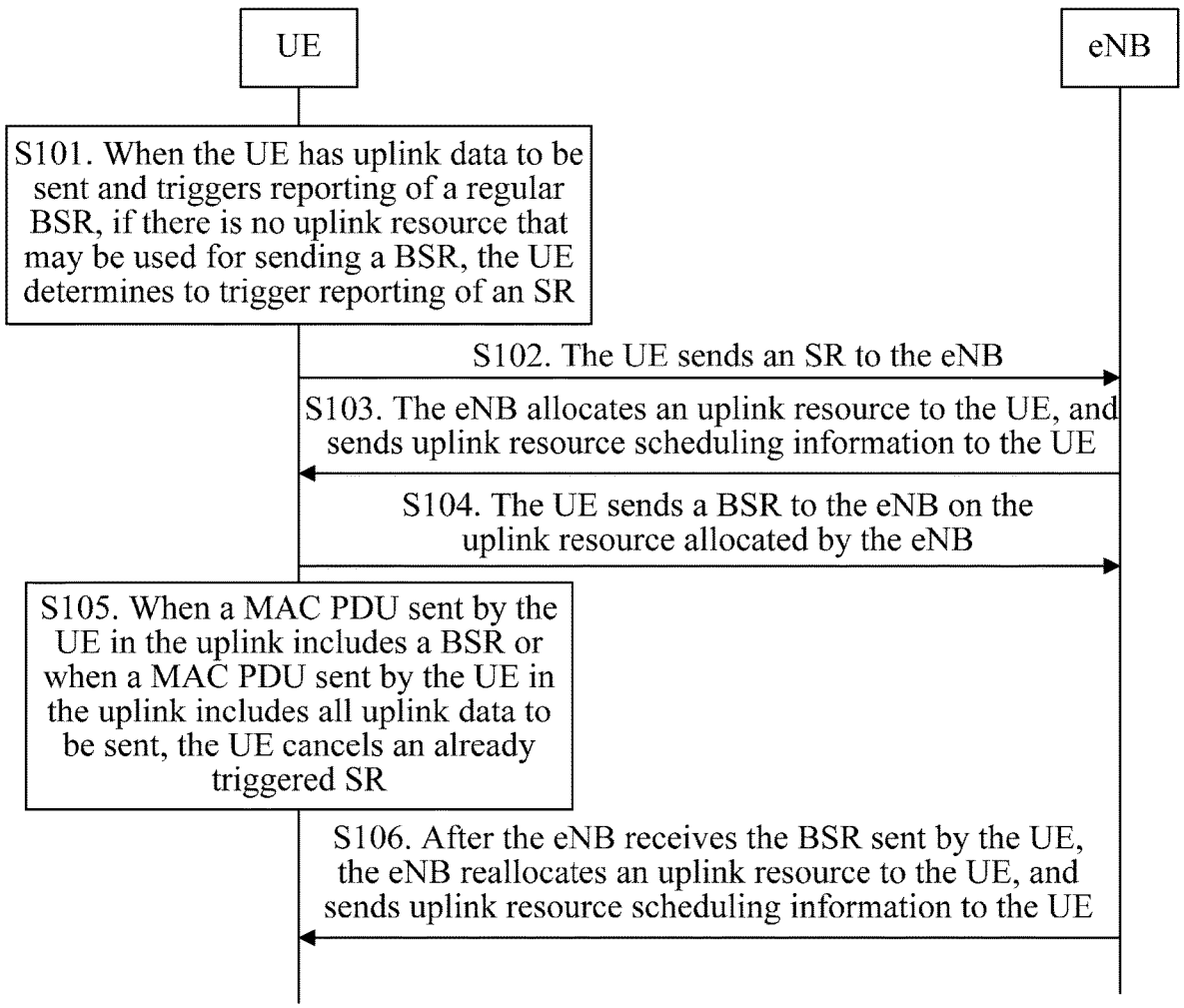
FIG. 1 is a signaling flowchart of reporting of a regular BSR in an LTE system.

FIG. 1 is a signaling flowchart of reporting of a regular BSR in an LTE system. As shown in FIG. 1, in step S101, when UE has uplink data to be sent and triggers reporting of a regular BSR, if there is no uplink resource that may be used for sending a BSR, the UE determines to trigger reporting of a scheduling request (SR). In step S102, the UE sends SR information to an eNB. In step S103, the eNB allocates an uplink resource to the UE, and sends uplink resource scheduling information to the UE, where the uplink resource is used for sending a BSR by the UE. In step S104, the UE sends a BSR to the eNB on the uplink resource allocated by the eNB. In step S105, when a Media Access Control (MAC) protocol data unit (PDU) sent by the UE in the uplink includes a BSR or when a MAC PDU sent by the UE in the uplink includes all uplink data to be sent, the UE cancels already triggered reporting of an SR. In step S106, after the eNB receives the BSR sent by the UE, the eNB reallocates an uplink resource to the UE, and sends uplink resource scheduling information to the UE, where the uplink resource is used to make the UE send uplink data, where a size of the uplink resource is determined according to the BSR sent by the UE.

Figure 2:
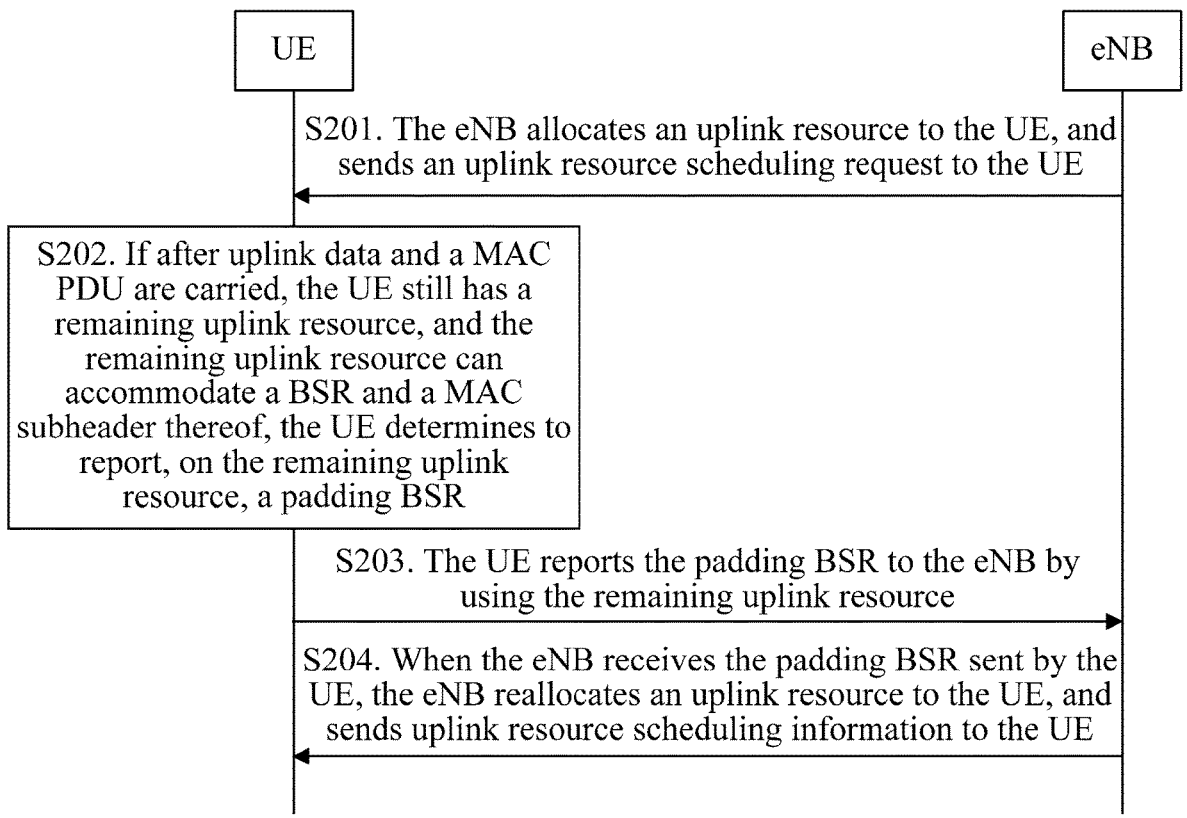
FIG. 2 is a signaling flowchart of reporting of a padding BSR in an LTE system.

FIG. 2 is a signaling flowchart of reporting of a padding BSR in an LTE system. As shown in FIG. 2, in step S201, an eNB allocates an uplink resource to UE, and sends an uplink resource scheduling request to the UE, where the uplink resource is used for sending data by the UE. In step S202, for the resource allocated by the eNB in step S201, if after uplink data and a MAC PDU are carried, the UE still has a remaining uplink resource, and the remaining uplink resource can accommodate a BSR and a MAC subheader of the BSR, the UE determines to report, on the remaining uplink resource, a padding BSR. In step S203, the UE reports the padding BSR to the eNB by using the remaining uplink resource. In step S204, when the eNB receives the padding BSR sent by the UE, the eNB reallocates an uplink resource to the UE, and sends uplink resource scheduling information to the UE, where the uplink resource is used to make the UE send uplink data, where a size of the uplink resource is determined according to the padding BSR sent by the UE.

A manner of reporting a periodic BSR in an LTE system is that an eNB allocates a particular uplink resource to UE, and the UE may periodically report a BSR to the eNB on the uplink resource; a specific implementation manner thereof is not described in detail herein again.

In the foregoing manner of reporting a BSR in the LTE system, each reported BSR is a BSR of a cellular network; because in the cellular network, only data transmission is performed between UE and an eNB, a volume of data sent by the UE to the eNB within a particular period of time is not excessively large. However, during D2D communication, a D2D device may simultaneously communicate with multiple other D2D devices; therefore, a volume of data transmitted by the D2D device within a particular period of time may be relatively large. In a base station-based resource scheduling mode, an uplink resource that is used for sending a BSR and is allocated by a base station to the D2D device may not be capable of carrying a BSR of data of D2D communication.

A BSR of D2D communication is referred to as a D2D BSR. If a manner of reporting a regular BSR in an LTE system is used, referring to FIG. 1, in step S101, when the UE has D2D data to be sent and triggers a regular D2D BSR, if there is no uplink resource that can be used for sending the D2D BSR, the UE determines to trigger reporting of an SR, and if a data volume of D2D communication of the UE is relatively large, the uplink resource allocated by the eNB to the UE in step S103 may not be enough for the UE to report the entire D2D BSR. In other words, the UE can report only a part of the D2D BSR to the eNB in step S104. However, in step S105, when detecting that a MAC PDU sent in the uplink includes a BSR, the UE cancels already triggered reporting of an SR, and when the eNB receives a D2D BSR reported by the UE, the eNB considers that the UE has reported the entire BSR that needs to be reported, and therefore, does not continue allocating an uplink resource to the UE to make the UE continue reporting of a remaining D2D BSR, thereby causing a problem that a part of the D2D BSR cannot be reported.

If the manner of reporting a padding BSR in the LTE system is used, referring to FIG. 2, the UE may performs both cellular communication and D2D communication, and therefore, there may be both a cellular communication BSR and a D2D BSR. In step S202, when the UE determines to report a padding BSR, because there are both the cellular communication BSR and the D2D BSR, the UE cannot determine which type of BSR needs to be reported.

If the manner of reporting a periodic BSR in the LTE system is used, same as the manner of reporting a regular BSR, the UE may not be capable of reporting, on a resource that is used for periodically reporting a BSR and is preallocated by the eNB, an entire D2D BSR.

The LTE system is used only as an example to describe problems that exist in reporting of a D2D BSR, but the present invention is not limited thereto. For example, in a system such as the Universal Mobile Telecommunications System (UMTS), the Global System for Mobile Communications (GSM), or the Worldwide Interoperability for Microwave Access (WiMAX) system, if D2D communication is performed, the foregoing problems also occur in reporting of a D2D BSR.

To sum up, when a D2D device cannot report, on an uplink resource that is used for reporting a D2D BSR and is allocated by a base station, an entire D2D BSR, how to report a D2D BSR is a problem to be resolved urgently at present.

Moreover, with evolution of a wireless communications network, uplink data of a cellular network gradually increases, and it may be predicted that, in the cellular network, a case in which UE cannot report, on an uplink resource that is used for reporting a BSR and is allocated by a base station, an entire BSR may also occur, and in such a case, how to report a BSR is also a problem that needs to be resolved.

Figure 3:
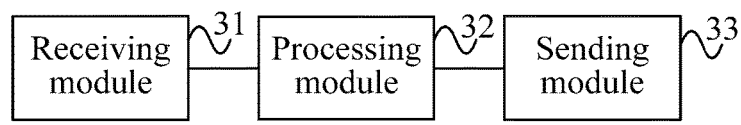
FIG. 3 is a schematic structural diagram of Embodiment 1 of user equipment according to an embodiment of the present invention.

FIG. 3 is a schematic structural diagram of Embodiment 1 of user equipment according to an embodiment of the present invention. As shown in FIG. 3, the user equipment of this embodiment includes a receiving module 31, a processing module 32, and a sending module 33.

The receiving module 31 is configured to receive first uplink resource scheduling information sent by a base station, where the first uplink resource scheduling information is used to indicate a first uplink resource allocated to the UE.

Specifically, the UE provided in this embodiment may be UE in any wireless communications system. The UE includes a receiving module 31, and the receiving module 31 is configured to receive first uplink resource scheduling information sent by a base station, where the first uplink resource scheduling information is used to indicate a first uplink resource allocated to the UE, where the first uplink resource is used to carry a BSR reported by the UE. The first uplink resource scheduling information received by the receiving module 31 may be periodically sent by the base station, or may be sent by the base station after the base station receives an SR sent by the UE.

The processing module 32 is configured to determine whether the first uplink resource can carry an entire BSR of the UE.

Specifically, after the receiving module 31 receives the first uplink resource scheduling information, the processing module 32 determines whether the first uplink resource can carry an entire BSR of the UE. The entire BSR of the UE is determined according to a data volume of all uplink data to be sent of the UE, and a larger volume of data to be sent of the UE indicates a larger BSR of the UE. Therefore, the processing module 32 may determine the entire BSR of the UE according to uplink data that is to be sent and is in a buffer of the UE, and determine whether the first uplink resource can carry the entire BSR of the UE.

The sending module 33 is configured to: if the processing module 32 determines that the first uplink resource cannot carry the entire BSR of the UE, send a first part of the entire BSR of the UE to the base station on the first uplink resource, where the first part does not include the entire BSR of the UE.

Specifically, if the processing module 32 determines that the first uplink resource cannot carry the entire BSR of the UE, at this time, the sending module 33 may first send a first part of the entire BSR of the UE to the base station, where the first part may be any part of the entire BSR of the UE as long as a size of the first part does not exceed a size of a BSR that can be carried by the first uplink resource.

Optionally, because the sending module 33 does not send the entire BSR of the UE to the base station, the sending module 33 also sends, to the base station, information indicating that not the entire BSR is sent at the same time; and after receiving the first part of the entire BSR of the UE and the information indicating that not the entire BSR is sent that are sent by the sending module 33, the base station can determine that the UE has not yet sent the entire BSR.

The receiving module 31 is further configured to receive second uplink resource scheduling information sent by the base station, where the second uplink resource scheduling information is used to indicate a second uplink resource allocated to the UE.

Specifically, when the base station determines that the UE has not yet sent the entire BSR, the base station continues allocating a first uplink resource to the UE. The receiving module 31 receives second uplink resource scheduling information sent by the base station, where the second uplink resource scheduling information is used to indicate a second uplink resource allocated to the UE, where the second uplink resource is used for carrying a BSR reported by the UE.

The sending module 33 is further configured to send a second part of the entire BSR of the UE to the base station on the second uplink resource.

Specifically, after the receiving module 31 receives the second uplink resource scheduling information, the sending module 33 may send a second part of the entire BSR of the UE to the base station on the second uplink resource. Generally, the second uplink resource allocated by the base station to the UE can enable the sending module 33 to report another part of the entire BSR except the first part. In other words, after sending the second part of the entire BSR to the base station on the second uplink resource, the sending module 33 has sent the entire BSR of the UE. If the second uplink resource allocated by the base station to the UE cannot enable the sending module 33 to report another part of the entire BSR except the first part, after the sending module 33 sends the second part of the entire BSR of the UE to the base station, the receiving module 31 further receives another piece of uplink resource scheduling information sent by the base station, and acquires another uplink resource scheduled by the base station, until the UE can send the entire BSR of the UE on the uplink resource scheduled by the base station.

Preferably, the second part of the entire BSR of the UE includes another part of the entire BSR of the UE except the first part. In other words, the UE does not repeatedly send an already sent BSR to the base station. However, in one case, the second part of the entire BSR of the UE includes the entire BSR of the UE. In this case, the second uplink resource allocated by the base station to the UE needs to be capable of carrying the entire BSR of the UE.

According to this embodiment, after UE receives first uplink resource scheduling information sent by a base station, if an entire BSR of the UE cannot be sent on a first uplink resource, the UE sends a first part of the entire BSR of the UE to the base station, so that the base station allocates a second uplink resource to the UE; and after the UE receives second uplink resource scheduling information sent by the base station, the UE sends a second part of the entire BSR of the UE to the base station on the second uplink resource, so that the UE can send the entire BSR to the base station.

Further, in the embodiment show in FIG. 3, optionally, the sending module 33 is further configured to: before the receiving module 31 receives the second uplink resource scheduling information sent by the base station, send, to the base station, information indicating that not the entire BSR is sent. The information indicating that not the entire BSR is sent includes at least one of the following information: remaining BSR indication information, and remaining-BSR capacity information.

Specifically, before the receiving module 31 receives the second uplink resource scheduling information sent by the base station, the sending module 33 sends, to the base station, the information indicating that not the entire BSR is sent, so that the base station learns that the UE has not yet sent the entire BSR of the UE. The information indicating that not an entire BSR are sent includes at least one of remaining BSR indication information, and remaining-BSR capacity information. The remaining BSR indication information is used to directly indicate whether the UE has sent the entire BSR, and the remaining-BSR capacity information is used to indicate capacity of the BSR that is not entirely sent by the UE. When the information indicating that not the entire BSR is sent is the remaining BSR indication information, the base station may directly determine, according to the remaining BSR indication information, that the UE has not yet sent the entire BSR. When the information indicating that not the entire BSR is sent is the remaining-BSR capacity information, the base station may determine, according to the remaining BSR capacity, that the UE has not yet sent the entire BSR, and determine capacity of the BSR that is not entirely sent by the UE. Further, the base station may allocate the second uplink resource to the UE according to the remaining-BSR capacity information, where the second uplink resource may be greater than or equal to capacity of the remaining BSR in the remaining-BSR capacity information, and therefore, the second part that is of the entire BSR of the UE and is sent by the sending module 33 on the second uplink resource may be another part of the entire BSR of the UE except the first part, that is, the sending module 33 may send the entire BSR when the base station allocates an uplink resource to the UE twice. Preferably, the second uplink resource is equal to the capacity of the BSR in the remaining-BSR capacity information, and in this way, the sending module 33 can report a BSR by using a minimum uplink resource.

Further, in the embodiment shown in FIG. 3, the receiving module 31 may receive the first uplink resource scheduling information periodically sent by the base station, and therefore, a method for reporting a BSR by UE is similar to a manner of reporting a periodic BSR, and is compatible with an existing manner of reporting a periodic BSR in a cellular network. If after the receiving module 31 receives the first uplink resource scheduling information, the processing module 32 determines that the first uplink resource can send the entire BSR of the UE, the method for reporting a BSR by UE in the embodiment shown in FIG. 3 is the same as the existing manner of reporting a periodic BSR in the cellular network.

Further, in the embodiment shown in FIG. 3, the processing module 32 is further configured to: before the receiving module 31 receives the first uplink resource scheduling information sent by the base station, trigger reporting of an SR; and the sending module 33 is further configured to send a first SR to the base station after the processing module 32 triggers the reporting of an SR, where the reporting of an SR is triggered when the processing module 32 triggers reporting of a regular BSR and when there is no uplink resource used for sending a BSR of the UE.

Specifically, the UE of the embodiment shown in FIG. 3 may also report a BSR by using a method for reporting a BSR that is similar to a manner of reporting a regular BSR in the cellular network. In this case, before the receiving module 31 receives the first uplink resource scheduling information sent by the base station, the processing module 32 triggers reporting of an SR. After the processing module 32 triggers the reporting of an SR, the sending module 33 sends a first SR to the base station. The reporting, which is triggered by the processing module 32, of the SR is triggered when the processing module 32 triggers reporting of a regular BSR and when there is no uplink resource used for sending a BSR of the UE. In other words, after triggering the reporting of a regular BSR, if the processing module 32 finds that there is no uplink resource that can be used for sending a BSR of the UE, the processing module 32 triggers the reporting of an SR, the sending module 33 sends the first SR to the base station, and after receiving the first SR, the base station reallocates a first uplink resource to the UE. This method for reporting a BSR by the UE is compatible with a method for reporting a regular BSR in a cellular network shown in FIG. 1.

Further, in the embodiment shown in FIG. 3, if the BSR is a D2D BSR, the processing module 32 is specifically configured to: when the UE is switched from an autonomous resource selection mode to a base station-based resource scheduling mode, and when there is data on a current D2D logical channel of the UE to be transmitted, trigger the reporting of a regular BSR.

Specifically, the processing module 32 triggers reporting of a regular BSR in many manners, and when the UE is performing D2D communication, one method for the processing module 32 to trigger reporting of a regular BSR may be: when the UE is switched from an autonomous resource selection mode to a base station-based resource scheduling mode, and there is data on a current D2D logical channel of the UE to be transmitted, triggering reporting of a regular BSR. An autonomous resource selection module of the UE indicates that the UE can autonomously select an uplink resource that is used for sending data, without needing to request a message to the base station; and the base station-based resource scheduling mode of the UE indicates that each resource used by the UE is allocated by the base station. When the UE is in the autonomous resource selection mode, the UE does not need to report a BSR to the base station, and may autonomously select a resource to send D2D data; and when the UE is in the base station-based resource scheduling mode, the UE needs to report a BSR to the base station, and only after the base station allocates an uplink resource to the UE, the UE can send D2D data.

Further, in the embodiment show in FIG. 3, the sending module 33 is specifically configured to send a second SR to the base station before the receiving module 31 receives the second uplink resource scheduling information sent by the base station.

Specifically, if the UE of the embodiment shown in FIG. 3 reports a BSR by using a method for reporting a BSR that is similar to the manner of reporting a regular BSR in the cellular network, that is, before the receiving module 31 receives the first uplink resource scheduling information sent by the base station, the processing module 32 triggers reporting of an SR, and after the processing module 32 triggers the reporting of an SR, the sending module 33 sends a first SR to the base station. Before the receiving module 31 receives the second uplink resource scheduling information sent by the base station, the sending module 33 sends a second SR to the base station, which is sent to the base station after the processing module 32 determines, after determining that the first uplink resource cannot send the entire BSR of the UE, not to cancel already triggered reporting of an SR or reporting of a regular BSR. That the sending module 33 sends a second SR to the base station implies information indicating that the UE has not yet sent the entire BSR. After receiving the second SR, the base station may learn that the UE has not yet sent the entire BSR, and therefore, may allocate a second uplink resource to the UE, which can similarly enable the UE to continue sending a second part of the entire BSR of the UE to the base station on the second uplink resource.

Further, in the embodiment shown in FIG. 3, the processing module 32 is further configured to: when the sending module 33 has sent the entire BSR of the UE to the base station, cancel already triggered reporting of an SR or reporting of a regular BSR.

Specifically, after the sending module 33 has sent the entire BSR of the UE to the base station, the processing module 32 cancels already triggered reporting of an SR or reporting of a regular BSR. In other words, after the UE has sent the entire BSR of the UE to the base station, the UE does not need to further send an SR to the base station to request scheduling an uplink resource, and does not need to send a BSR to the base station. Therefore, the processing module 32 cancels already triggered reporting of an SR or reporting of a regular BSR.

Further, in the embodiment shown in FIG. 3, the processing module 32 is further configured to: when the UE is switched from the base station-based resource scheduling mode to the autonomous resource selection mode, cancel reporting, which is already triggered and is used for a D2D resource request, of an SR, where the reporting, which is used for the D2D resource request, of the SR refers to reporting, of an SR, that is triggered when after reporting of a D2D BSR is triggered, there is no uplink resource sending a D2D BSR.

Specifically, regardless of whether the UE reports a BSR in a manner similar to the manner of reporting a periodic BSR in the cellular network or reports a BSR in a manner similar to the manner of reporting a regular BSR in the cellular network, when the UE is switched from the base station-based resource scheduling mode to the autonomous resource selection mode, the UE can autonomously select an uplink resource without needing the base station to allocate an uplink resource. Therefore, whatever state the UE is in, when the UE is switched from the base station-based resource scheduling mode to the autonomous resource selection mode, the processing module 32 can cancel reporting, which is already triggered and is used for a D2D resource request, of an SR. The SR sent by the UE to the base station is used for making the base station allocate a resource that is needed by the UE for sending data, and the reporting, which is used for a D2D resource request, of the SR herein is used for making the base station schedule a resource that is used by the UE for D2D communication. Specifically, the reporting, which is used for a D2D resource request, of an SR refers to reporting, which is triggered when after reporting of a D2D BSR of the UE is triggered, the UE has no uplink resource sending a D2D BSR.

Further, in the embodiment shown in FIG. 3, the processing module 32 is further configured to: when the UE is switched from the base station-based resource scheduling mode to the autonomous resource selection mode, cancel already triggered reporting of a BSR.

Specifically, regardless of whether the UE reports a BSR in a manner similar to the manner of reporting a periodic BSR in the cellular network or reports a BSR in a manner similar to the manner of reporting a regular BSR in the cellular network, when the UE is switched from the base station-based resource scheduling mode to the autonomous resource selection mode, the UE can autonomously select an uplink resource without needing the base station to allocate an uplink resource. Therefore, whatever state the UE is in, when the UE is switched from the base station-based resource scheduling mode to the autonomous resource selection mode, the processing module 32 cancels already triggered reporting of a BSR.

Further, in the embodiment shown in FIG. 3, the processing module 32 is further configured to: when the UE is switched from the base station-based resource scheduling mode to the autonomous resource selection mode, cancel a random access process that is already triggered and is used for a D2D resource request, where the random access that is used for the D2D resource request refers to a random access process that is triggered when after reporting of a D2D BSR is triggered, there is no uplink resource sending a D2D BSR and no physical uplink control channel (PUCCH) for sending an SR is configured for the UE; and the canceling, a random access process that is already triggered and is used for a D2D resource request includes at least one of the following operations: canceling sending of a preamble code, canceling sending of a message 3 (MSG 3), and ending the random access process and considering that the random access process is successfully completed.

Specifically, regardless of whether the UE reports a BSR in a manner similar to the manner of reporting a periodic BSR in the cellular network or reports a BSR in a manner similar to the manner of reporting a regular BSR in the cellular network, when the UE is switched from the base station-based resource scheduling mode to the autonomous resource selection mode, the UE can autonomously select an uplink resource without needing the base station to allocate an uplink resource. Therefore, whatever state the UE is in, when the UE is switched from the base station-based resource scheduling mode to the autonomous resource selection mode, the processing module 32 can cancel a random access process that is already triggered and is used for a D2D resource request. A random access process of the UE is used for access to the base station, and the random access process of the UE includes: first sending a preamble code to the base station, receiving a random access response (a message 2) sent by the base station, then sending a message 3 to the base station, and the like. A random access process used for a D2D resource request refers to a random access process that is triggered when after reporting of a D2D BSR is triggered, there is no uplink resource sending a D2D BSR and no PUCCH for sending an SR is configured for the UE. A process of canceling the random access process that is already triggered and is used for a D2D resource request includes at least one of the following operations: canceling sending of a preamble code, canceling sending of a message 3, and ending the random access process and considering that the random access process is successfully completed.

Further, in the embodiment shown in FIG. 3, the BSR includes the D2D BSR. When the UE performs D2D communication, a D2D BSR is generated. A feature of the D2D communication is that a volume of uplink communication data may be relatively large, and therefore, capacity of the D2D BSR may also be relatively large, and an uplink resource that is needed for reporting the D2D BSR by the UE is also relatively large. Therefore, the UE of the embodiment shown in FIG. 3 can send the entire BSR of the UE to the base station, thereby resolving a problem of reporting of a D2D BSR.

Figure 4:
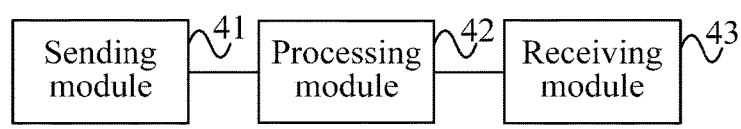
FIG. 4 is a schematic structural diagram of Embodiment 1 of a base station according to an embodiment of the present invention.

FIG. 4 is a schematic structural diagram of Embodiment 1 of a base station according to an embodiment of the present invention. As shown in FIG. 4, the base station of this embodiment includes a sending module 41, and a receiving module 43.

The sending module 41 is configured to send first uplink resource scheduling information to UE, where the first uplink resource scheduling information is used to indicate a first uplink resource allocated to the UE.

Specifically, the base station provided in this embodiment may be a base station in any form in any wireless communications system, as long as the base station has a resource scheduling capability. The base station includes a sending module 41, and the sending module 41 is configured to send first uplink resource scheduling information to UE, where the first uplink resource scheduling information is used to indicate a first uplink resource allocated to the UE, where the first uplink resource is used to carry a BSR reported by the UE. The base station of this embodiment further includes a processing module 42, and the processing module 42 is configured to determine the first uplink resource allocated to the UE.

The receiving module 43 is configured to: if the first uplink resource cannot carry an entire BSR of the UE, receive a first part that is of the entire BSR of the UE and is sent by the UE on the first uplink resource, where the first part does not include the entire BSR of the UE.

Specifically, after the sending module 41 sends a first uplink resource allocation message to the UE, the UE determines whether the first uplink resource can carry an entire BSR of the UE. If the first uplink resource cannot carry the entire BSR of the UE, the receiving module 43 in the base station receives a first part that is of the entire BSR of the UE and is sent by the UE on the first uplink resource, where the first part may be any part of the entire BSR of the UE, as long as a size of the first part does not exceed a size of a BSR that can be carried by first uplink resource.

The sending module 41 is further configured to send second uplink resource scheduling information to the UE, where the second uplink resource scheduling information is used to indicate a second uplink resource allocated to the UE.

Specifically, after the receiving module 43 receives the first part that is of the entire BSR of the UE and is sent by the UE, the processing module 42 determines to allocate a second uplink resource to the UE, and the sending module 41 sends the second uplink resource scheduling information to the UE, where the second uplink resource scheduling information used to indicates the second uplink resource allocated to the UE, where the second uplink resource is used for carrying a BSR reported by the UE, so that UE can continue reporting, on the second uplink resource, a BSR.

The receiving module 43 is further configured to receive a second part that is of the entire BSR of the UE and is sent by the UE on the second uplink resource.

Specifically, after the sending module 41 sends a second uplink resource allocation message to the UE, the UE may send a second part of the entire BSR of the UE to the base station on the second uplink resource. Generally, the second uplink resource determined by the processing module 42 can enable the UE to report another part of the entire BSR except the first part; in other words, after receiving, on the second uplink resource, the second part that is of the entire BSR and is sent by the UE, the sending module 43 has received the entire BSR of the UE. If the second uplink resource determined by the processing module 42 cannot enable the UE to report another part of the entire BSR except the first part, after the receiving module 43 receives the second part that is of the entire BSR of the UE and is sent by the UE, the processing module 42 continues determining an uplink resource used by the UE for reporting a BSR, and the sending module 41 continues sending uplink resource scheduling information to the UE, until the receiving module 43 receives the entire BSR of the UE that are sent by the UE.

Preferably, the second part of the entire BSR of the UE includes another part of the entire BSR of the UE except the first part. In other words, the UE does not repeatedly send an already sent BSR to the base station. However, in one case, the second part of the entire BSR of the UE includes the entire BSR of the UE. In this case, the second uplink resource allocated by the base station to the UE needs to be capable of carrying the entire BSR of the UE.

According to this embodiment, after a base station sends first uplink resource scheduling information to UE, if a first uplink resource cannot carry an entire BSR of the UE, the base station receives a first part that is of the entire BSR of the UE and is sent by the UE, so that the base station allocates a second uplink resource to the UE; and after the base station sends second uplink resource scheduling information to the UE, the base station receives a second part that is of the entire BSR of the UE and is sent by the UE on the second uplink resource, so that the UE can send the entire BSR to the base station.

Further, in the embodiment show in FIG. 4, the receiving module 43 is further configured to: before the sending module 41 sends the second uplink resource scheduling information to the UE, receive information indicating that not the entire BSR is sent that is sent by the UE. The information indicating that not the entire BSR is sent includes at least one of the following information: remaining BSR indication information, and remaining-BSR capacity information.

Specifically, before the sending module 41 sends the second uplink resource scheduling information to the UE, the receiving module 43 may further receive the information indicating that not the entire BSR is sent that is sent by the UE. After the receiving module 43 receives the information indicating that not the entire BSR is sent, the processing module 42 may learn that the UE has not yet sent the entire BSR. The information indicating that not an entire BSR are sent that is sent by the UE and is received by the receiving module 43 may include at least one of remaining BSR indication information, and remaining-BSR capacity information. The remaining BSR indication information is used to directly indicate whether the UE has sent the entire BSR, and the remaining-BSR capacity information is used to indicate capacity of the BSR that is not entirely sent. When the information indicating that not the entire BSR is sent is the remaining BSR indication information, the base station may determine, according to the remaining BSR indication information, that the UE has not yet sent the entire BSR. When the information indicating that not the entire BSR is sent is the remaining-BSR capacity information, the base station may determine, according to the remaining BSR capacity, that the UE has not yet sent the entire BSR, and determine capacity of the BSR that is not entirely sent by the UE. Further, the base station may allocate the second uplink resource to the UE according to the remaining-BSR capacity information, where the second uplink resource may be greater than or equal to capacity of a remaining BSR in the remaining-BSR capacity information, and therefore, the second part that is of the entire BSR of the UE and is received by receiving module 43 on the second uplink resource may be another part of the entire BSR of the UE except the first part, that is, the UE may send the entire BSR of the UE when the base station allocates an uplink resource to the UE twice. Preferably, the second uplink resource is equal to the capacity of the BSR in the remaining-BSR capacity information, and in this way, the UE can report a BSR by using a minimum uplink resource.

Further, in the embodiment shown in FIG. 4, the sending module 41 is specifically configured to periodically send the first uplink resource scheduling information to the UE. Therefore, a method of reporting a BSR by the UE is similar to a manner of reporting a periodic BSR, and is compatible with an existing manner of reporting a periodic BSR in a cellular network; and if after the sending module 41 sends the first uplink resource scheduling information to the UE, the UE determines that the first uplink resource can send the entire BSR of the UE, the method, which is received by the base station of the embodiment shown in FIG. 4, for reporting a BSR by UE is the same as the existing manner of reporting a periodic BSR in a cellular network.

Further, in the embodiment shown in FIG. 4, the receiving module 43 is further configured to: before the sending module 41 sends the first uplink resource scheduling information to the UE, receive a first SR sent by the UE, where the first SR is sent after reporting of an SR is triggered when the UE triggers reporting of a regular BSR and when there is no uplink resource used for sending a BSR of the UE.

Specifically, the base station of the embodiment shown in FIG. 4 may also receive a BSR reported by the UE by using a method for reporting a BSR that is similar to a manner of reporting a regular BSR in a cellular network. In this case, before the sending module 41 sends the first uplink resource scheduling information to the UE, the receiving module 43 first receives a first SR sent by the UE, where the first SR is sent after reporting of an SR is triggered when the UE triggers reporting of a regular BSR and when there is no uplink resource used for sending a BSR of the UE. In other words, when after triggering reporting of a regular BSR, the UE finds that there is no uplink resource that can be used for sending a BSR of the UE, the UE triggers reporting of an SR; at this time, the receiving module 43 receives the first SR sent by the UE; after the receiving module 43 receives the first SR, the sending module then sends the first uplink resource scheduling information to the UE. this method for reporting a BSR is compatible with a method for reporting a regular BSR in a cellular network shown in FIG. 1.

Further, in the embodiment show in FIG. 4, the sending module 43 is further configured to: before the sending module 41 sends the second uplink resource scheduling information to the UE, receive a second SR sent by the UE.

Specifically, the base station of the embodiment shown in FIG. 4 receives a BSR that is reported by the UE by using a method for reporting a BSR that is similar to the manner of reporting a regular BSR in the cellular network, that is, before the sending module 41 sends the first uplink resource scheduling information to the UE, the receiving module 43 receives the first SR sent by the UE. Before the sending module sends the second uplink resource scheduling information to the UE, the receiving module 43 receives the second SR sent by the UE. The second SR is sent after the UE determines, after determining that the first uplink resource cannot send the entire BSR of the UE, not to cancel already triggered reporting of an SR or reporting of a regular BSR. That the UE sends the second SR to the base station implies information indicating that the UE has not yet sent the entire BSR. After receiving the second SR, the receiving module 43 may learn that the UE has not yet sent the entire BSR, and therefore, may allocate a second uplink resource to the UE, which can similarly enable the UE to continue sending a second part of the entire BSR of the UE to the base station on the second uplink resource.

Further, in the embodiment shown in FIG. 4, the BSR includes a D2D BSR. When the UE performs D2D communication, a D2D BSR is generated. A feature of the D2D communication is that a volume of uplink communication data may be relatively large, and therefore, capacity of the D2D BSR may also be relatively large, and an uplink resource that is needed for reporting the D2D BSR by the UE is also relatively large. Therefore, the base station of the embodiment shown in FIG. 4 can receive the entire BSR of the UE that is sent by the UE, thereby resolving a problem of reporting of a D2D BSR.

Figure 5:
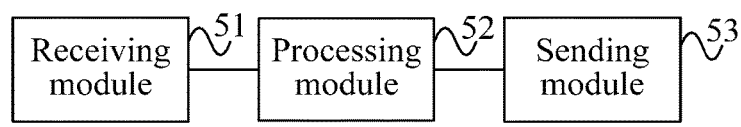
FIG. 5 is a schematic structural diagram of Embodiment 2 of user equipment according to an embodiment of the present invention.

FIG. 5 is a schematic structural diagram of Embodiment 2 of user equipment according to an embodiment of the present invention. As shown in FIG. 5, the user equipment of this embodiment includes a receiving module 51, a processing module 52, and a sending module 53.

The receiving module 51 is configured to receive first uplink resource scheduling information sent by a base station, where the first uplink resource scheduling information is used to indicate a first uplink resource allocated to the UE.

Specifically, the UE provided in this embodiment may be UE in any wireless communications system. A difference between the UE provided in this embodiment and the UE provided in the embodiment shown in FIG. 3 lies in that, a method, which is used by the UE provided in this embodiment, for reporting a BSR is similar to the method, shown in FIG. 2, for reporting a padding BSR in a cellular network, and is compatible with the method for reporting a padding BSR in a cellular network.

The UE includes a receiving module 51, and the receiving module 51 is configured to receive first uplink resource scheduling information sent by a base station, where the first uplink resource scheduling information is used to indicate a first uplink resource allocated to the UE, where the first uplink resource is used to carry uplink data sent by the UE. There is a difference between the first uplink resource herein and the first uplink resource indicated by the first uplink resource scheduling information received by the receiving module 31 of the embodiment shown in FIG. 3, that is, in the embodiment shown in FIG. 3, the first uplink resource, which is allocated to the UE, in the first uplink resource scheduling information received by the receiving module 31 is used for carrying a BSR reported by the UE, while in this embodiment, the receiving module 51 is used for carrying uplink data sent by the UE to the base station.

The processing module 52 is configured to trigger reporting of a padding BSR, and determine whether a remaining resource can carry an entire BSR of the UE after the first uplink resource carries uplink data and a MAC PDU.

Specifically, after the receiving module 51 receives the first uplink resource scheduling information, the processing module 51 first determines whether to trigger reporting of a padding BSR. Similar to that in the embodiment shown in FIG. 2, the padding BSR is carried on a remaining resource that is after the first uplink resource sends the uplink data. Only if the processing module 51 determines to trigger reporting of a padding BSR, and after carrying the uplink data and the MAC PDU, the first uplink resource has a remaining resource, the UE can send the padding BSR to the base station. In addition, the processing module 51 further needs to determine whether a remaining resource, which is after the first uplink resource carries the uplink data and the MAC PDU, can carry the entire BSR of the UE.

The sending module 53 is configured to: if the processing module 52 triggers the reporting of a padding BSR and determines that the remaining resource cannot carry the entire BSR of the UE after the first uplink resource carries the uplink data and the MAC PDU, send a BSR to the base station according to a preset BSR priority rule.

Specifically, the padding BSR only occupies a remaining resource in an uplink resource that is used for sending normal data, and therefore, the reporting of a padding BSR does not need to report an entire BSR, and even though the UE cannot use the manner of reporting a padding BSR to report the entire BSR of the UE, the UE still triggers reporting of a regular BSR when a condition for triggering reporting of a regular BSR is met, which, therefore, does not affect normal data transmission. Therefore, the UE provided in this embodiment does not need to send the entire BSR of the UE to the base station. If the processing module 52 triggers the reporting of a padding BSR and determines that the remaining resource cannot carry the entire BSR of the UE after the first uplink resource carries the uplink data and the MAC PDU, the sending module 53 sends a BSR to the base station according to a preset BSR priority rule. The BSR priority rule may be preset in the UE, and for example, the BSR priority rule may be: sorting priorities according to data features represented by BSRs. For example, a cellular BSR generated in cellular network communication is preferentially sent, and a D2D BSR generated in D2D communication is subsequently sent. In a word, the sending module 53 may send, on the first uplink resource, a part of the entire BSR according to the preset priority rule.

According to this embodiment, if after receiving the first uplink resource scheduling information sent by the base station, the UE triggers reporting of a padding BSR, and the UE determines that after the first uplink resource carries the uplink data and the MAC PDU, the remaining resource cannot carry the entire BSR of the UE, the UE reports a BSR to the base station according to the preset priority rule, so that when the UE triggers reporting of a padding BSR, the UE can correctly send a BSR to the base station.

Further, in the embodiment shown in FIG. 5, the BSR priority rule includes that: a priority of a cellular BSR is higher than a priority of a D2D BSR. In other words, when the UE triggers reporting of a padding BSR, if there are both a cellular BSR and a D2D BSR, the UE preferentially reports the cellular BSR.

Specifically, a specific manner of sending, by the sending module 53, a BSR to the base station according to a preset priority rule is provided herein. The entire BSR of the UE include a cellular BSR and a D2D BSR, that is, the UE performs both cellular network communication and D2D communication. The sending module 53 preferentially sends the cellular BSR to the base station; that is, if a volume of data reported by the cellular BSR is 0, the sending module 53 preferentially sends the D2D BSR to the base station on the first uplink resource; or if a volume of data reported by the cellular BSR is not 0, the sending module 53 preferentially sends the cellular BSR to the base station on the first uplink resource.

Figures 6, 7:
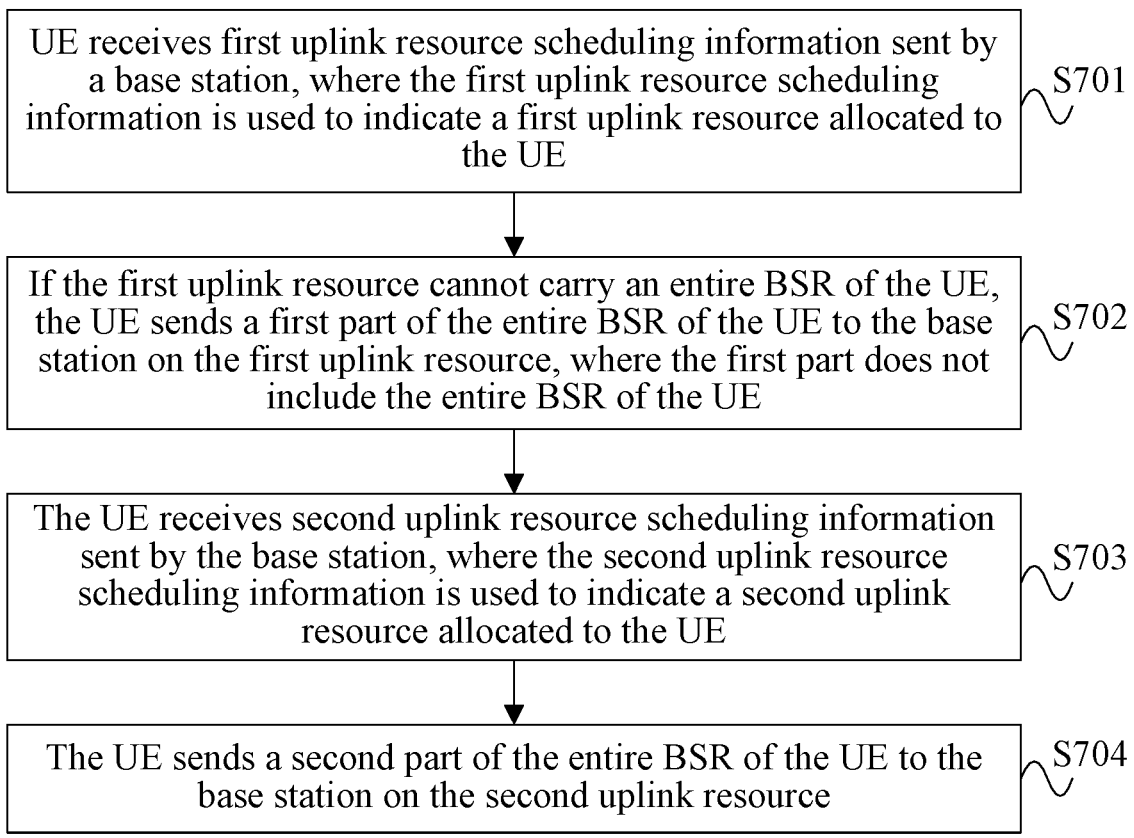
FIG. 6 is a schematic structural diagram of Embodiment 2 of a base station according to an embodiment of the present invention.
FIG. 7 is a flowchart of Embodiment 1 of a method for reporting a buffer status report according to an embodiment of the present invention.

FIG. 6 is a schematic structural diagram of Embodiment 2 of a base station according to an embodiment of the present invention. As shown in FIG. 6, the base station of this embodiment includes a sending module 61, and a receiving module 62.

The sending module 61 is configured to send first uplink resource scheduling information to UE, where the first uplink resource scheduling information is used to indicate a first uplink resource allocated to the UE.

Specifically, the base station provided in this embodiment may be a base station in any form in any wireless communications system, as long as the base station has a resource scheduling capability. The base station includes a sending module 61, and the sending module 61 is configured to send first uplink resource scheduling information to UE, where the first uplink resource scheduling information is used to indicate a first uplink resource allocated to the UE, where the first uplink resource is used to carry uplink data sent by the UE. The base station of this embodiment further includes a processing module 63, and the processing module 63 is configured to determine the first uplink resource allocated to the UE.

The receiving module 62 is configured to receive, on the first uplink resource, a BSR that is sent by the UE to the base station according to a preset BSR priority rule, where the BSR is sent after the UE determines that a remaining resource cannot carry an entire BSR of the UE after the uplink resource carries uplink data and a MAC PDU.

Specifically, the base station of this embodiment is configured to receive a BSR reported by UE in the embodiment shown in FIG. 5. The UE in the embodiment shown in FIG. 5 uses a manner similar to the manner of reporting a padding BSR in a cellular network shown in FIG. 2, and therefore, on the first uplink resource, the UE not only sends a BSR but also sends uplink data. The receiving module 63 receives, on the first uplink resource, the uplink data sent by the UE and the BSR sent by the UE.

After the receiving module 62 receives, on the first uplink resource, the BSR, the processing module 63 performs determining on the BSR, to determine whether the BSR is a cellular BSR or a D2D BSR. If the BSR received by the receiving module 63 is a D2D BSR, the processing module 62 determines that a data volume of a cellular BSR that corresponds to the UE is 0, that is, the UE has no cellular network communication data to be sent.

According to this embodiment, if after receiving the first uplink resource scheduling information sent by the base station, the UE triggers a padding BSR, and the UE determines that after the first uplink resource carries the uplink data and the MAC PDU, the remaining resource cannot carry the entire BSR of the UE, the UE reports a BSR to the base station according to the preset priority rule, so that when the UE triggers reporting of a padding BSR, the UE can correctly send a BSR to the base station.

Further, in the embodiment shown in FIG. 6, the BSR priority rule includes that: a priority of a cellular BSR is higher than a priority of a D2D BSR.

FIG. 7 is a flowchart of Embodiment 1 of a method for reporting a buffer status report according to an embodiment of the present invention. As shown in FIG. 7, the method of this embodiment includes:

Step S701. UE receives first uplink resource scheduling information sent by a base station, where the first uplink resource scheduling information is used to indicate a first uplink resource allocated to the UE.

Step S702. If the first uplink resource cannot carry an entire BSR of the UE, the UE sends a first part of the entire BSR of the UE to the base station on the first uplink resource, where the first part does not include the entire BSR of the UE.

Step S703. The UE receives second uplink resource scheduling information sent by the base station, where the second uplink resource scheduling information is used to indicate a second uplink resource allocated to the UE.

Step S704. The UE sends a second part of the entire BSR of the UE to the base station on the second uplink resource.

The method for reporting a buffer status report of this embodiment is used for implementing processing by the user equipment shown in FIG. 3, and the implementation principle and technical effects thereof are similar to those of the user equipment, which are not described herein again.

Further, in the embodiment shown in FIG. 7, the second part includes another part of the entire BSR of the UE except the first part; or the second part includes the entire BSR of the UE.

Further, in the embodiment shown in FIG. 7, before the receiving, by the UE, second uplink resource scheduling information sent by the base station, the method further includes: sending, by the UE to the base station, information indicating that not the entire BSR is sent.

Further, in the embodiment shown in FIG. 7, the information indicating that not the entire BSR is sent includes at least one of the following information: remaining BSR indication information, and remaining-BSR capacity information.

Further, in the embodiment shown in FIG. 7, the receiving, by UE, first uplink resource scheduling information sent by a base station includes: receiving, by the UE, the first uplink resource scheduling information periodically sent by the base station.

Figure 8:
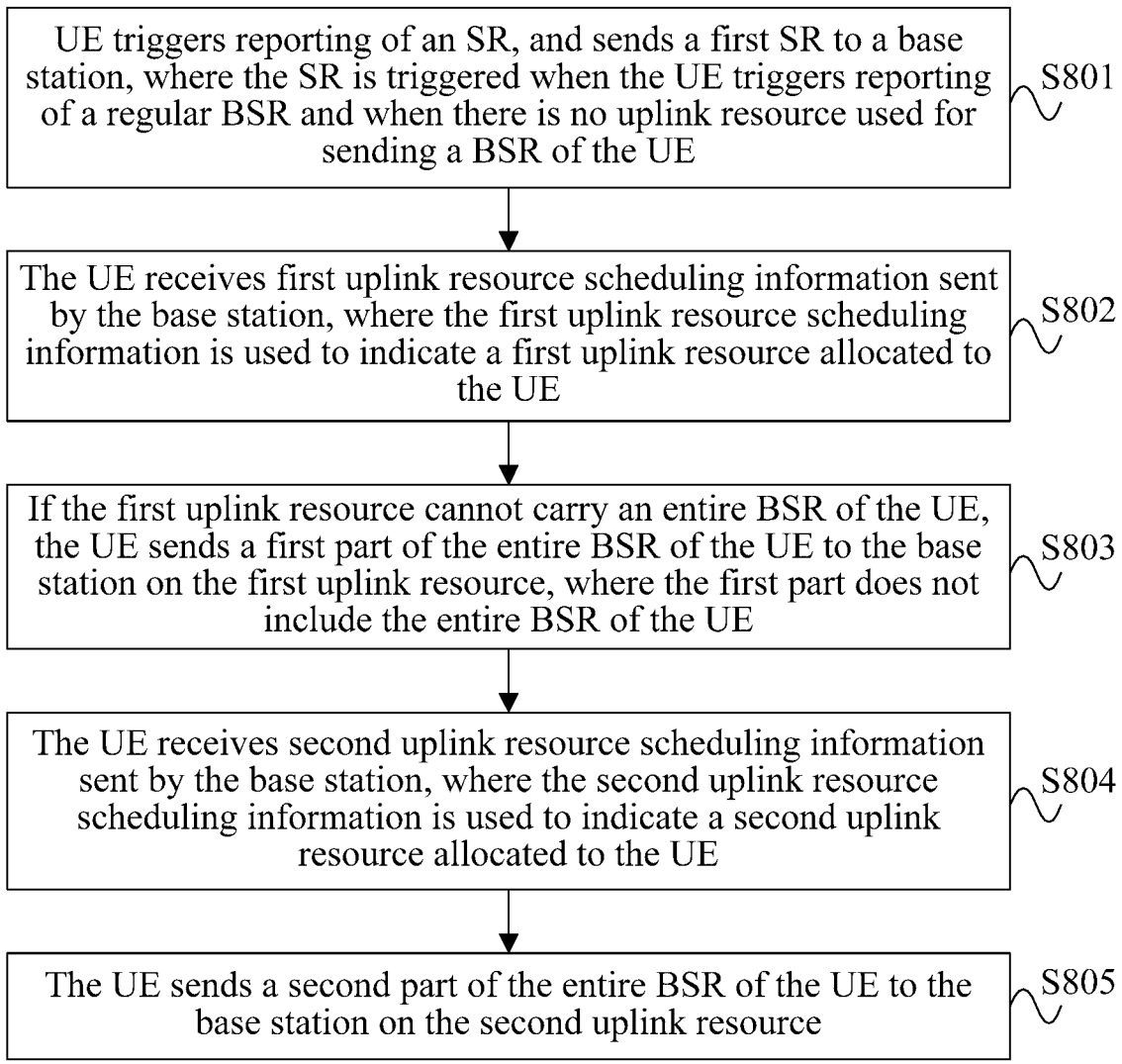
FIG. 8 is a flowchart of Embodiment 2 of a method for reporting a buffer status report according to an embodiment of the present invention.

FIG. 8 is a flowchart of Embodiment 2 of a method for reporting a buffer status report according to an embodiment of the present invention. As shown in FIG. 8, the method of this embodiment includes:

Step S801. UE triggers reporting of an SR, and sends a first SR to a base station, where the SR is triggered when the UE triggers reporting of a regular BSR and when there is no uplink resource used for sending a BSR of the UE.

Step S802. The UE receives first uplink resource scheduling information sent by the base station, where the first uplink resource scheduling information is used to indicate a first uplink resource allocated to the UE.

Step S803. If the first uplink resource cannot carry an entire BSR of the UE, the UE sends a first part of the entire BSR of the UE to the base station on the first uplink resource, where the first part does not include the entire BSR of the UE.

Step S804. The UE receives second uplink resource scheduling information sent by the base station, where the second uplink resource scheduling information is used to indicate a second uplink resource allocated to the UE.

Step S805. The UE sends a second part of the entire BSR of the UE to the base station on the second uplink resource.

Further, in the embodiments shown in FIG. 8, the triggering, by the UE, reporting of a regular BSR includes:

when the UE is switched from an autonomous resource selection mode to a base station-based resource scheduling mode, and when there is data on a current D2D logical channel of the UE to be transmitted, triggering, by the UE, the reporting of a regular BSR.

Further, in the embodiment shown in FIG. 8, before the receiving, by the UE, second uplink resource scheduling information sent by the base station, the method further includes:

sending, by the UE, a second SR to the base station.

Further, in the embodiment shown in FIG. 8, when the UE has sent the entire BSR of the UE to the base station, the UE cancels already triggered reporting of an SR or reporting of a regular BSR.

Further, in the embodiment shown in FIG. 8, when the UE is switched from the base station-based resource scheduling mode to the autonomous resource selection mode, the UE cancels reporting, which is already triggered and is used for a D2D resource request, of an SR, where the reporting, which is used for the D2D resource request, of the SR refers to reporting, of an SR, that is triggered when after reporting of a D2D BSR is triggered, there is no uplink resource sending a D2D BSR.

Further, in the embodiment shown in FIG. 7 or FIG. 8, when the UE is switched from the base station-based resource scheduling mode to the autonomous resource selection mode, the UE cancels already triggered reporting of a BSR.

Further, in the embodiment shown in FIG. 7 or FIG. 8, when the UE is switched from the base station-based resource scheduling mode to the autonomous resource selection mode, the UE cancels a random access process that is already triggered and is used for a D2D resource request, where the random access that is used for the D2D resource request refers to a random access process that is triggered when after reporting of a D2D BSR is triggered, there is no uplink resource sending a D2D BSR and no PUCCH for sending an SR is configured for the UE; and the canceling, a random access process that is already triggered and is used for a D2D resource request includes at least one of the following operations: canceling sending of a Preamble code, canceling sending of an MSG 3, and ending the random access process and considering that the random access process is successfully completed.

Further, in the embodiment shown in FIG. 7 or FIG. 8, the BSR includes the D2D BSR.

Figure 9:
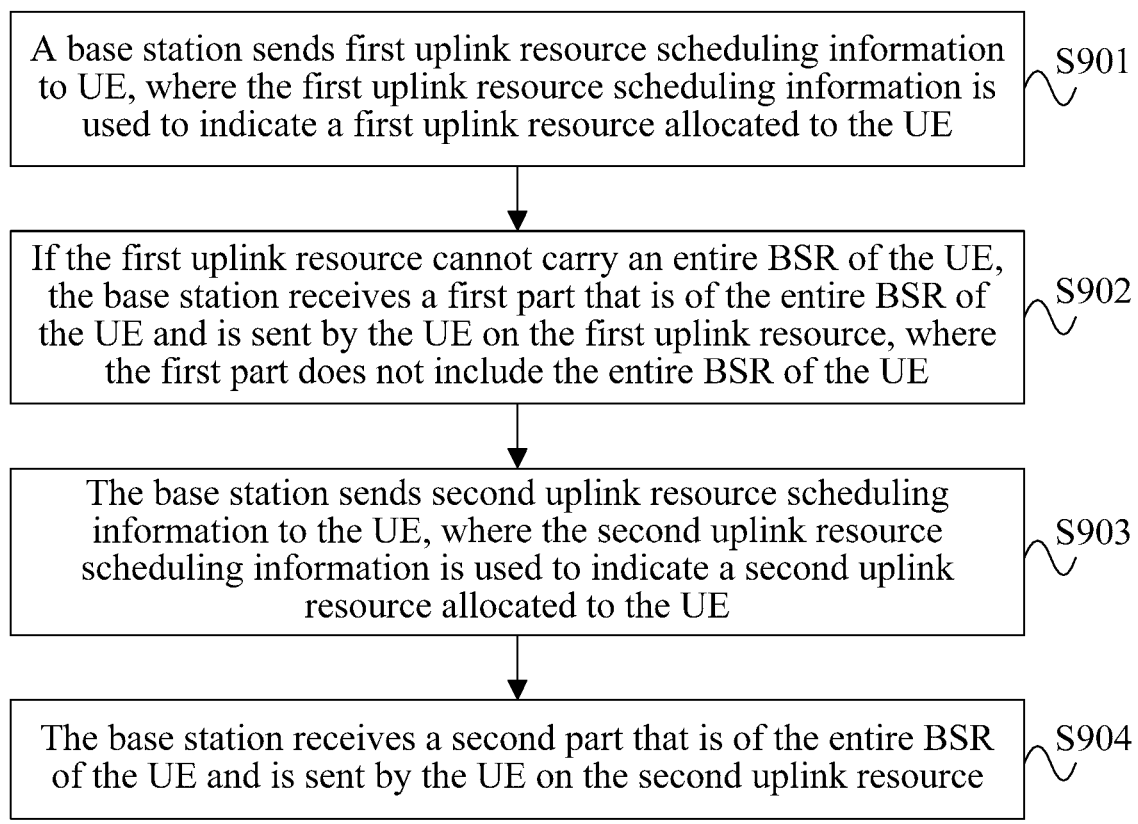
FIG. 9 is a flowchart of Embodiment 3 of a method for reporting a buffer status report according to an embodiment of the present invention.

FIG. 9 is a flowchart of Embodiment 3 of a method for reporting a buffer status report according to an embodiment of the present invention. As shown in FIG. 9, the method of this embodiment includes:

Step S901. A base station sends first uplink resource scheduling information to UE, where the first uplink resource scheduling information is used to indicate a first uplink resource allocated to the UE.

Step S902. If the first uplink resource cannot carry an entire BSR of the UE, the base station receives a first part that is of the entire BSR of the UE and is sent by the UE on the first uplink resource, where the first part does not include the entire BSR of the UE.

Step S903. The base station sends second uplink resource scheduling information to the UE, where the second uplink resource scheduling information is used to indicate a second uplink resource allocated to the UE.

Step S904. The base station receives a second part that is of the entire BSR of the UE and is sent by the UE on the second uplink resource.

The method for reporting a buffer status report of this embodiment is used for implementing processing by the base station shown in FIG. 4, and the implementation principle and technical effects thereof are similar to those of the base station, which are not described herein again.

Further, in the embodiment shown in FIG. 9, the second part includes another part of the entire BSR of the UE except the first part; or the second part includes the entire BSR of the UE.

Further, in the embodiment shown in FIG. 9, before the sending, by the base station, second uplink resource scheduling information to the UE, the method further includes:

receiving, by the base station, information indicating that not the entire BSR is sent that is sent by the UE.

Further, in the embodiment shown in FIG. 9, the information indicating that not the entire BSR is sent includes at least one of the following information: remaining BSR indication information, and remaining-BSR capacity information.

Further, in the embodiment shown in FIG. 9, the sending, by a base station, first uplink resource scheduling information to UE includes: periodically sending, by the base station, the first uplink resource scheduling information to the UE.

Figure 10:
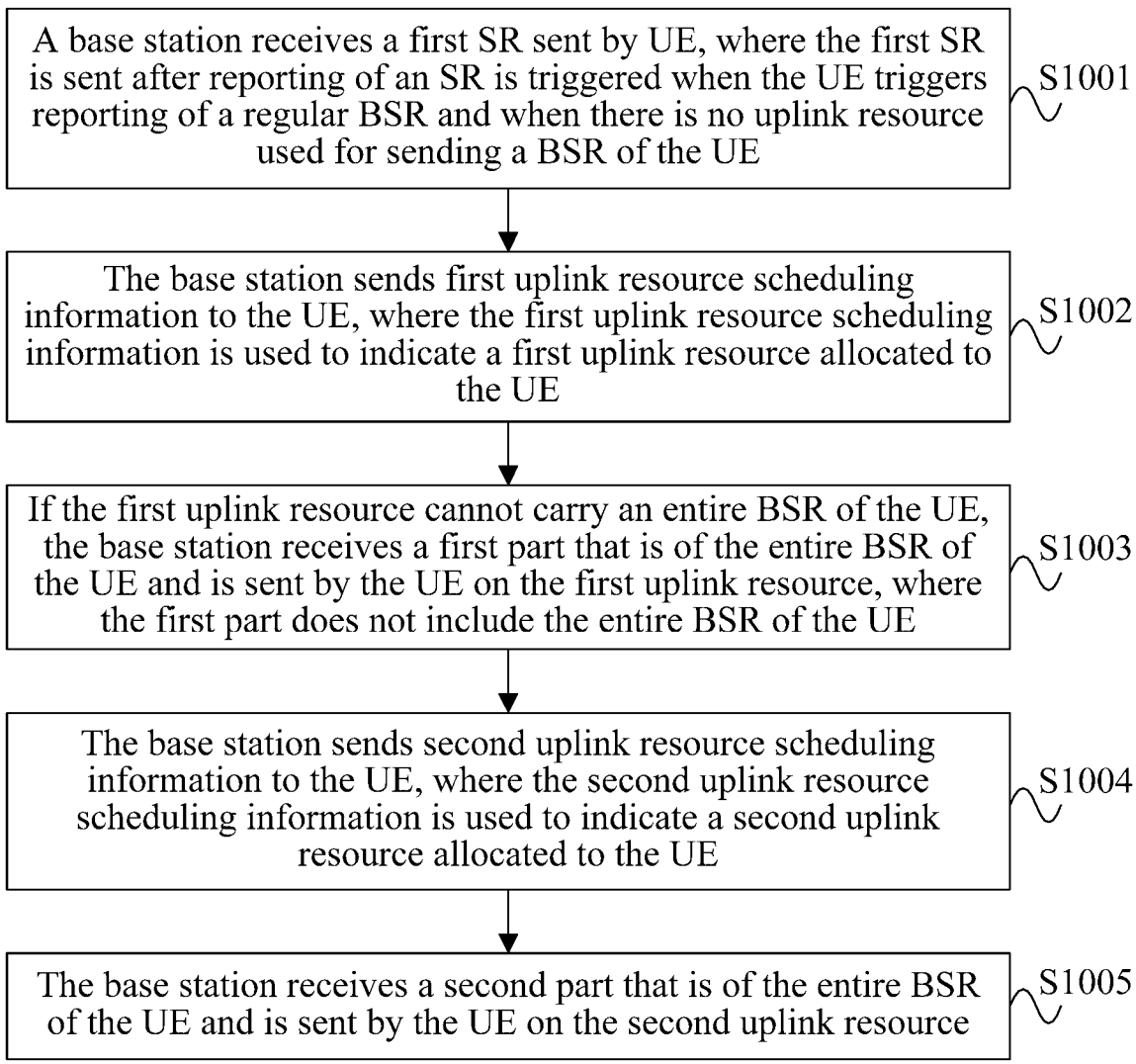
FIG. 10 is a flowchart of Embodiment 4 of a method for reporting a buffer status report according to an embodiment of the present invention.

FIG. 10 is a flowchart of Embodiment 4 of a method for reporting a buffer status report according to an embodiment of the present invention. As shown in FIG. 10, the method of this embodiment includes:

Step S1001. A base station receives a first SR sent by UE, where the first SR is sent after reporting of an SR is triggered when the UE triggers reporting of a regular BSR and when there is no uplink resource used for sending a BSR of the UE.

Step S1002. The base station sends first uplink resource scheduling information to the UE, where the first uplink resource scheduling information is used to indicate a first uplink resource allocated to the UE.

Step S1003. If the first uplink resource cannot carry an entire BSR of the UE, the base station receives a first part that is of the entire BSR of the UE and is sent by the UE on the first uplink resource, where the first part does not include the entire BSR of the UE.

Step S1004. The base station sends second uplink resource scheduling information to the UE, where the second uplink resource scheduling information is used to indicate a second uplink resource allocated to the UE.

Step S1005. The base station receives a second part that is of the entire BSR of the UE and is sent by the UE on the second uplink resource.

Further, in the embodiment shown in FIG. 10, before the sending, by the base station, second uplink resource scheduling information to the UE, the method further includes:

receiving, by the base station, a second SR sent by the UE.

Further, in the embodiment shown in FIG. 9 or FIG. 10, the BSR includes a D2D BSR.

Figure 11:
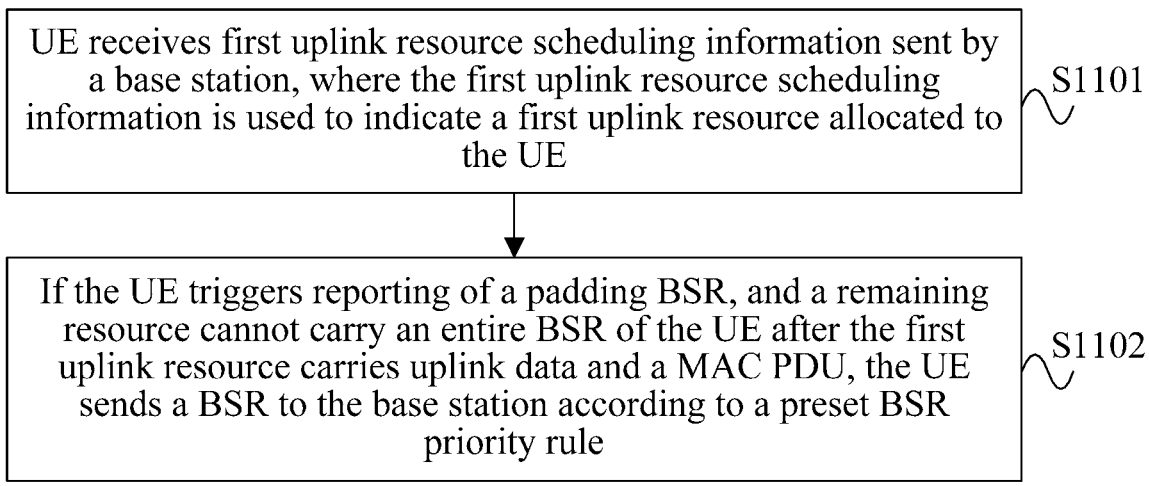
FIG. 11 is a flowchart of Embodiment 5 of a method for reporting a buffer status report according to an embodiment of the present invention.

FIG. 11 is a flowchart of Embodiment 5 of a method for reporting a buffer status report according to an embodiment of the present invention. As shown in FIG. 11, the method of this embodiment includes:

Step S1101. UE receives first uplink resource scheduling information sent by a base station, where the first uplink resource scheduling information is used to indicate a first uplink resource allocated to the UE.

Step S1102. If the UE triggers padding reporting of a BSR, and a remaining resource cannot carry an entire BSR of the UE after the first uplink resource carries uplink data and a MAC PDU, the UE sends a BSR to the base station according to a preset BSR priority rule.

The method for reporting a buffer status report of this embodiment is used for implementing processing by the user equipment shown in FIG. 5, and the implementation principle and technical effects thereof are similar to those of the user equipment, which are not described herein again.

Further, in the embodiment shown in FIG. 11, the BSR priority rule includes that: a priority of a cellular BSR is higher than a priority of a device to device D2D BSR.

Further, in the embodiment shown in FIG. 11, the entire BSR of the UE includes a cellular BSR and a D2D BSR, and the sending, by the UE, a BSR to the base station according to a preset BSR priority rule includes: if a volume of data reported by the cellular BSR is 0, the UE preferentially sends the D2D BSR to the base station on the first uplink resource; or if a volume of data reported by the cellular BSR is not 0, the UE preferentially sends the cellular BSR to the base station on the first uplink resource.

Figure 12:
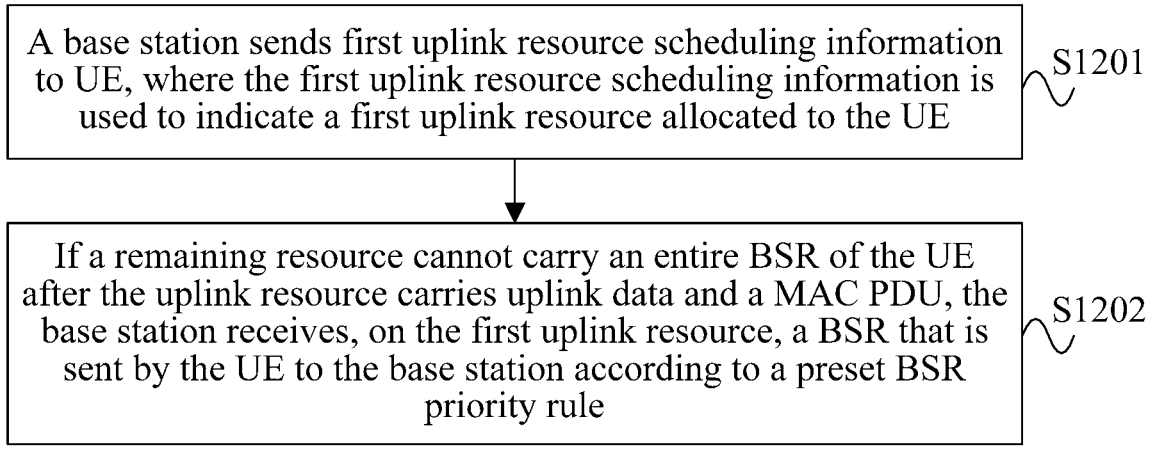
FIG. 12 is a flowchart of Embodiment 6 of a method for reporting a buffer status report according to an embodiment of the present invention.

FIG. 12 is a flowchart of Embodiment 6 of a method for reporting a buffer status report according to an embodiment of the present invention. As shown in FIG. 12, the method of this embodiment includes:

Step S1201. A base station sends first uplink resource scheduling information to UE, where the first uplink resource scheduling information is used to indicate a first uplink resource allocated to the UE.

Step S1202. If a remaining resource cannot carry an entire BSR of the UE after the uplink resource carries uplink data and a MAC PDU, the base station receives, on the first uplink resource, a BSR that is sent by the UE to the base station according to a preset BSR priority rule.

The method for reporting a buffer status report of this embodiment is used for implementing processing by the base station shown in FIG. 6, and the implementation principle and technical effects thereof are similar to those of the base station, which are not described herein again.

Further, in the embodiment shown in FIG. 12, the BSR priority rule includes that: a priority of a cellular BSR is higher than a priority of a D2D BSR.

Further, in the embodiments shown in FIG. 12, if the base station receives, on the first uplink resource, only a D2D BSR, the base station determines that a data volume of a cellular BSR that corresponds to the UE is 0.

It should be noted that, the receiving module 31 or the receiving module 51 in the embodiments of the present invention may correspond to a receiver of the user equipment, or may correspond to a transceiver of the user equipment. The processing module 32 or the processing module 52 may correspond to a processor of the user equipment, and the processor herein may be a central processing unit (CPU), or an application-specific integrated circuit (ASIC), or one or more integrated circuits for implementing the embodiments of the present invention. The sending module 33 or the sending module 53 may correspond to a transmitter of the user equipment, or may correspond to the transceiver of the user equipment. The user equipment may further include a memory, where the memory is configured to store instruction code, and the processor calls the instruction code in the memory, to control the receiving module 31 or the receiving module 51 or the sending module 33 or the sending module 53 to perform the foregoing operations.

The sending module 41 or the sending module 61 in the embodiments of the present invention may correspond to a transmitter of the base station, or may correspond to a transceiver of the base station. The processing module 42 or the processing module 63 may correspond to a processor of the base station, and the processor herein may be a CPU, or an ASIC, or one or more integrated circuits for implementing the embodiments of the present invention. The receiving module 43 or the receiving module 62 may correspond to a receiver of the base station, or may correspond to the transceiver of the base station. The base station may further include a memory, where the memory is configured to store instruction code, and the processor calls the instruction code in the memory, to control the sending module 41 or the sending module 61 or the receiving module 43 or the receiving module 62 to perform the foregoing operations.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a read-only memory (ROM), a random access memory (RAM), a magnetic disc, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof. Therefore, the protection scope of the present invention shall be subject to the protection scope of the claims.

What is claimed is:

1. An apparatus, comprising a processor;
and a non-transitory computer-readable storage medium including computer-executable instructions executed by the processor to perform, on the apparatus, operations comprising:
receiving first uplink resource scheduling information from a base station, wherein the first uplink resource scheduling information is used to indicate a first uplink resource allocated to the apparatus;
determining whether the first uplink resource can carry an entire buffer status report (BSR) of the apparatus;
when the processor determines that the first uplink resource cannot carry the entire BSR of the apparatus, sending a first part of the entire BSR of the apparatus to the base station on the first uplink resource, wherein the first part does not comprise the entire BSR of the apparatus;
sending, to the base station, information indicating that the entire BSR has not been sent;
based on sending the information indicating that the entire BSR has not been sent, receiving second uplink resource scheduling information from the base station, wherein the second uplink resource scheduling information is used to indicate a second uplink resource allocated to the apparatus; and
sending the entire BSR of the apparatus to the base station on the second uplink resource.

2. The apparatus according to claim 1, wherein the operations further comprise:
when the apparatus triggers reporting of a regular BSR and there is no uplink resource available for sending a BSR of the apparatus,
triggering reporting of a scheduling request (SR); and
sending a first SR to the base station.

3. The apparatus according to claim 2, wherein the triggering, by the apparatus, reporting of a regular BSR comprises:
when the apparatus is switched from an autonomous resource selection mode to a base station-based resource scheduling mode and there is data on a current device to device (D2D) logical channel of the apparatus to be transmitted,
triggering the reporting of a regular BSR.

4. The apparatus according to claim 2, wherein the operations further comprise: when the entire BSR of the apparatus to the base station has been sent, cancelling a reporting of a regular BSR.

5. The apparatus according to claim 1, wherein the operations further comprise: when the apparatus is switched from a base station-based resource scheduling mode to an autonomous resource selection mode, cancel already triggered reporting of a BSR.

6. The apparatus according to claim 1, wherein the BSR comprises a device to device (D2D) BSR.

7. A method for reporting a buffer status report, comprising:
receiving, by terminal device, first uplink resource scheduling information from a base station, wherein the first uplink resource scheduling information is used to indicate a first uplink resource allocated to the terminal device;
when the first uplink resource cannot carry an entire buffer status report (BSR) of the terminal device, sending, by the terminal device, a first part of the entire BSR of the terminal device to the base station on the first uplink resource, wherein the first part does not comprise the entire BSR of the terminal device;
sending, to the base station, information indicating that the entire BSR has not been sent;
based on sending the information indicating that the entire BSR has not been sent, receiving second uplink resource scheduling information from the base station, wherein the second uplink resource scheduling information is used to indicate a second uplink resource allocated to the terminal device; and
sending a second part of the entire BSR of the terminal device to the base station on the second uplink resource, wherein the second part comprises the entire BSR of the terminal device.

8. The method according to claim 7, further comprising:
when the terminal device triggers reporting of a regular BSR and when there is no uplink resource available for sending a BSR of the terminal device,
terminal device, reporting of a scheduling request (SR), and sending a first SR to the base station.

9. The method according to claim 8, wherein the triggering, by the terminal device, reporting of a regular BSR comprises:
when the terminal device is switched from an autonomous resource selection mode to a base station-based resource scheduling mode and there is data on a current device to device (D2D) logical channel of the terminal device to be transmitted,
triggering, by the terminal device, the reporting of a regular BSR.

10. The method according to claim 7, comprising:
when the terminal device has sent the entire BSR of the terminal device to the base station, canceling, by the terminal device, a reporting of a regular BSR.

11. The method according to claim 7, comprising:
when the terminal device is switched from a base station-based resource scheduling mode to an autonomous resource selection mode,
cancelling, by the terminal device, an already triggered reporting of a BSR.

12. The method according to claim 7, wherein the BSR comprises a device to device (D2D) BSR.

13. An apparatus, comprising a processor; and a non-transitory computer-readable storage medium including computer-executable instructions executed by the processor to perform, on the apparatus, operations comprising:

sending first uplink resource scheduling information to a terminal device, wherein the first uplink resource scheduling information is used to indicate a first uplink resource allocated to the terminal device;

if the first uplink resource cannot carry an entire buffer status report (BSR) of the terminal device, receiving, from the terminal device on the first uplink resource, a first part of the entire BSR of the terminal device, wherein the first part does not comprise the entire BSR of the terminal device;

receiving, from the terminal device, information indicating that the entire BSR has not been sent;

based on receiving the information indicating that the entire BSR has not been sent, sending second uplink resource scheduling information to the terminal device, wherein the second uplink resource scheduling information is used to indicate a second uplink resource allocated to the terminal device;

receiving, from the terminal device on the second uplink resource, the entire BSR of the terminal device; and allocating the first uplink resource and the second uplink resource to the terminal device.

14. The apparatus according to claim 13, wherein the operations further comprise:

receiving a first scheduling request SR from the terminal device, wherein the first SR is sent after reporting of an SR is triggered when the terminal device triggers reporting of a regular BSR and when there is no uplink resource used for sending a BSR of the terminal device.

15. The apparatus according to claim 14, wherein the BSR comprises a device to device D2D BSR.

* * * * *